(12) United States Patent
Nishimura

(10) Patent No.: US 10,280,329 B2
(45) Date of Patent: May 7, 2019

(54) PIGMENT DISPERSION AND PRODUCING METHOD THEREOF

(71) Applicant: FUJIFILM CORPORATION, Minato-ku, Tokyo (JP)

(72) Inventor: Naoko Nishimura, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 162 days.

(21) Appl. No.: 15/045,257

(22) Filed: Feb. 17, 2016

(65) Prior Publication Data
US 2016/0289486 A1   Oct. 6, 2016

(30) Foreign Application Priority Data

Mar. 31, 2015  (JP) ................................ 2015-074035

(51) Int. Cl.
| | |
|---|---|
| C09D 133/10 | (2006.01) |
| C09D 11/38 | (2014.01) |
| C09D 11/326 | (2014.01) |
| C09B 67/08 | (2006.01) |
| C09B 67/46 | (2006.01) |
| C09D 17/00 | (2006.01) |
| C09D 11/08 | (2006.01) |
| C09D 11/107 | (2014.01) |

(52) U.S. Cl.
CPC .......... *C09D 133/10* (2013.01); *C09B 67/009* (2013.01); *C09B 67/0013* (2013.01); *C09D 11/08* (2013.01); *C09D 11/107* (2013.01); *C09D 11/326* (2013.01); *C09D 11/38* (2013.01); *C09D 17/001* (2013.01)

(58) Field of Classification Search
CPC ...... C09D 11/322; C09D 133/10; C09D 11/38
USPC .......................... 209/128; 106/31.27; 524/272
See application file for complete search history.

(56) References Cited

U.S. PATENT DOCUMENTS

| | | | |
|---|---|---|---|
| 2009/0103950 A1 | 4/2009 | Nakayama et al. | |
| 2011/0172325 A1* | 7/2011 | Mori ................... | C09D 5/1612 523/122 |

FOREIGN PATENT DOCUMENTS

| | | |
|---|---|---|
| JP | S59-217776 A | 12/1984 |
| JP | S63-186781 A | 8/1988 |
| JP | 2004-43776 A | 2/2004 |
| JP | 2010-7020 A | 1/2010 |
| JP | 2010-96876 A | 4/2010 |
| JP | 2011-144240 A | 7/2011 |
| JP | 2011-231315 A | 11/2011 |
| WO | WO 2013/167662 * | 11/2013 |
| WO | 2015/151725 A1 | 10/2015 |

OTHER PUBLICATIONS

Extended European Search Report dated Aug. 19, 2016, issued in corresponding EP Patent Application.

English language translation of the following: Office action dated Jun. 20, 2017 from the JPO in a Japanese patent application No. 2015-074035 corresponding to the instant patent application. This office action translation is submitted now in order to supplement the understanding of the cited references which are being disclosed in the instant Information Disclosure Statement.

* cited by examiner

*Primary Examiner* — Deve E Valdez
(74) *Attorney, Agent, or Firm* — Solaris Intellectual Property Group, PLLC

(57) ABSTRACT

The present invention provides a pigment dispersion and a method of producing the pigment dispersion. The pigment dispersion includes: water; a pigment; a pigment dispersing polymer; and a rosin acid that includes at least one selected from the group consisting of abietic acid, salts of abietic acid, dihydroabietic acid and salts of dihydroabietic acid, and a total content of abietic acid, salts of abietic acid, dihydroabietic acid and salts of dihydroabietic acid is 50% by mass or higher with respect to a total mass of the rosin acid contained in the pigment dispersion. The pigment dispersion is excellent in terms of dispersibility, storage stability after dispersion, and jettability when used for an inkjet recording ink.

18 Claims, No Drawings

PIGMENT DISPERSION AND PRODUCING METHOD THEREOF

CROSS-REFERENCE TO RELATED APPLICATION

The present application claims priority under 35 U.S.C. § 119 to Japanese Patent Application No. 2015-074035, filed Mar. 31, 2015. The above application is hereby expressly incorporated by reference, in its entirety, into the present application.

BACKGROUND OF THE INVENTION

Technical Field

The present invention relates to a pigment dispersion and a method of producing the pigment dispersion.

Background Art

In recent years, with the progress in inkjet recording technology, an inkjet recording method has become to be used for highly precise images such as photographs or off-set printings. Therefore, high-quality recording in accordance with an inkjet recording method is demanded.

With regard to such demands, as a method of producing an ink which exhibits excellent dispersion stability and provides printed matter having excellent color forming property and also excellent transparency, a method has been proposed, which includes a process of obtaining a solution containing a dispersing agent and a water insoluble coloring material dissolved in an aprotic organic solvent in the presence of alkali, a process of mixing this solution with water, to obtain a dispersion in which particles containing the water insoluble coloring material and the dispersing agent are dispersed, a process of adding an acid to the dispersion to form an aggregate, and separating the aggregate, and a process of performing alkali treatment to re-disperse the particles of the aggregate (see, for example, Japanese Patent Application Laid-Open (JP-A) No. 2004-43776).

Further, in ink compositions formed by using a polymerizable compound and a pigment dispersion, as an ink composition which has excellent discharge reliability over a long period of time and can form an image without defects such as image voids, an ink composition including a pigment covered with a dispersion polymer that is obtained by crosslinking a water soluble dispersing agent using a crosslinking agent, a water soluble polymerizable compound, a polymerization initiator, and water has been proposed (see, for example, JP-A No. 2011-231315).

As a pigment dispersion in which a pigment is finely dispersed and in which the dispersion stability of the pigment is excellent even in a case in which the pigment dispersion is stored for a long time, a pigment dispersion including a pigment, a polymer which contains a repeating unit with a specific structure having a resin acid derivative and has a weight average molecular weight within a range of from 10,000 to 1,000,000, and a polymerizable compound has been proposed (see, for example, JP-A No. 2010-7020).

As a finer and more stable pigment dispersion, a pigment dispersion which is formed by dispersing a pigment in water, the pigment surface being in an acidic state, using an anionic surface active agent as a dispersing agent and which can also be used for inkjet recording has been proposed (see, for example, JP-A No. 2010-96876).

SUMMARY OF THE INVENTION

Technical Problem

However, in the inks or pigment dispersions described in Patent Documents 1 to 4, there are cases in which dispersibility of the pigment is deteriorated, because of separation of the dispersing agent that covers the pigment, or the like. Accordingly, in the process of dispersing a pigment, there is room for further improvement in dispersibility.

Further, in an ink or a pigment dispersion, among the components added as a dispersing agent, there may be a substance that rather deteriorates the storage stability of the prepared ink or the pigment dispersion, or deteriorates the ejection property, when the substance is included at a certain amount or greater.

For instance, in the production of a pigment dispersion, when a rosin acid is added, the dispersibility of the pigment can be improved. However, there are many cases in which a rosin compound derived from a natural product is used as the rosin acid, and thus, the composition thereof is not fixed. Accordingly, depending on the composition of the rosin acid, there are cases in which favorable dispersibility cannot be obtained.

The present invention has been made in view of the above circumstances and aims to accomplish the following object.

Namely, an object of the invention is to provide a pigment dispersion, which has excellent dispersibility and excellent storage stability after dispersion and also exhibits excellent ejection property when the pigment dispersion is applied to an ink for inkjet recording, and a method of producing the pigment dispersion.

Specific means for addressing the above problems are as follows.

<1> A pigment dispersion including: water; a pigment; a pigment dispersing polymer; and a rosin acid that includes at least one selected from the group consisting of abietic acid, salts of abietic acid, dihydroabietic acid and salts of dihydroabietic acid, a total content of abietic acid, salts of abietic acid, dihydroabietic acid and salts of dihydroabietic acid being 50% by mass or higher, and preferably in a range of from 60% by mass to 95% by mass with respect to a total mass of the rosin acid contained in the pigment dispersion.

<2> The pigment dispersion according to the item <1>, wherein a ratio of the total content of dihydroabietic acid and salts of dihydroabietic acid relative to the total content of abietic acid and salts of abietic acid (total content of dihydroabietic acid and salts of dihydroabietic acid/total content of abietic acid and salts of abietic acid) is in a range of from 0.1 to 1.0 based on mass.

<3> The pigment dispersion according to the item <1> or the item <2>, wherein a content of the rosin acid is in a range of from 0.25% by mass to 30.0% by mass with respect to a total mass of the pigment.

<4> The pigment dispersion according to any one of the items <1> to <3>, wherein a content of the rosin acid is in a range of from 0.25% by mass to 3.0% by mass with respect to a total mass of the pigment.

<5> The pigment dispersion according to any one of the items <1> to <4>, wherein the pigment dispersing polymer includes a hydrophilic structural unit and a hydrophobic structural unit.

<6> The pigment dispersion according to any one of the items <1> to <5>, wherein the pigment dispersing polymer includes a hydrophilic structural unit derived from (meth)acrylic acid and a hydrophobic structural unit derived from at least one selected from the group consisting of a (meth)

acrylate having an alkyl group having from 1 to 20 carbon atoms, a derivative of a (meth)acrylate having an alkyl group having from 1 to 20 carbon atoms, benzyl (meth)acrylate, a derivative of benzyl (meth)acrylate, phenoxyethyl (meth) acrylate, and a derivative of phenoxyethyl (meth)acrylate.

<7> The pigment dispersion according to any one of the items <1> to <6>, wherein an acid value of the pigment dispersing polymer is in a range of from 90 mgKOH/g to 150 mgKOH/g.

<8> The pigment dispersion according to any one of the items <1> to <7>, wherein a pH of the pigment dispersion is in a range of from 8.0 to 9.5.

<9> The pigment dispersion according to any one of the items <1> to <8>, wherein the pigment dispersing polymer includes a cross-linked structure.

<10> The pigment dispersion according to any one of the items <1> to <9>, wherein the pigment dispersion is used for an inkjet recording ink.

<11> A method of producing a pigment dispersion, the method including: a mixing process of mixing water, a pigment, a pigment dispersing polymer, and a rosin acid including at least one selected from the group consisting of abietic acid, salts of abietic acid, dihydroabietic acid, and salts of dihydroabietic acid, to obtain a mixture liquid, in which a total content of abietic acid, salts of abietic acid, dihydroabietic acid, and salts of dihydroabietic acid is 50% by mass or higher, with respect to a total content of the rosin acid; and a dispersion process of subjecting the mixture liquid obtained in the mixing process to a dispersion treatment, to obtain a dispersion.

<12> The method of producing a pigment dispersion according to the item <11>, wherein an amount of the rosin acid contained in the mixture liquid obtained in the mixing process is 3.0% by mass or more and 30.0% by mass or less, with respect to a mass of the pigment.

<13> The method of producing a pigment dispersion according to the item <11> or the item <12>, wherein the mixing process includes: a first process of mixing at least the pigment and the rosin acid including at least one selected from the group consisting of abietic acid, salts of abietic acid, dihydroabietic acid, and salts of dihydroabietic acid, to obtain a first liquid; and a second process of mixing the pigment dispersing polymer and the first liquid obtained in the first process, to obtain a second liquid.

<14> The method of producing a pigment dispersion according to any one of the items <11> to <13>, further comprising a pH adjusting process that adjusts a pH of the mixture liquid obtained in the mixing process to 8.0 or more and 9.5 or less by using a water solution containing a monovalent alkali metal.

<15> The method of producing a pigment dispersion according to any one of the items <11> to <14>, further comprising a reducing process that reduces an amount of the rosin acid in the dispersion obtained in dispersion process to less than 3.0% by mass with respect to the total mass of the pigment.

Advantageous Effects of Invention

According to the invention, a pigment dispersion which has excellent dispersibility and excellent storage stability after dispersion and also exhibits excellent ejection property when the pigment dispersion is applied to an ink for inkjet recording, and a method of producing the pigment dispersion may be provided.

DESCRIPTION OF EMBODIMENTS

Hereinafter, specific embodiments of the invention are described in detail, but it should be construed that the invention is by no means limited to the following embodiments. The embodiments may be practiced with modifications, as appropriate, within a range that does not depart from the object of the invention.

In this specification, a numerical range described by using the term "to" means a range including numerical values described in front of and behind "to", as the minimum value and the maximum value, respectively.

In this specification, in a case in which plural substances corresponding to a component are present in a composition, the amount of the component in the composition means the total amount of the plural substances that are present in the composition, unless otherwise specified.

In this specification, the term "process" includes not only an independent process, but also a case which cannot be clearly distinguished from other process, as long as the predetermined object of the process is achieved.

In this specification, when a substituent (atomic group) is described without specifying whether substituted or unsubstituted, the substituent is used in a large sense including a substituent having no substituent and a substituent further having a substituent, unless otherwise specified. For example, in a case in which "an alkyl group" is described, the alkyl group is used in a large sense including an alkyl group having no substituent and an alkyl group further having a substituent. The same applies to other substituents (atomic groups).

In this specification, the concept of the term "(meth) acrylic acid" encompasses both acrylic acid and methacrylic acid, and the concept of the term "(meth)acrylate" encompasses both acrylate and methacrylate.

[Pigment Dispersion]

The pigment dispersion of the invention is a pigment dispersion, which contains water, a pigment, a pigment dispersing polymer, and a rosin acid including at least one selected from the group consisting of abietic acid, salts of abietic acid, dihydroabietic acid, and salts of dihydroabietic acid, and in which the total content of abietic acid, salts of abietic acid, dihydroabietic acid, and salts of dihydroabietic acid is 50% by mass or higher, based on the whole rosin acid contained in the pigment dispersion.

The pigment dispersion of the invention has excellent dispersibility and excellent storage stability after dispersion (hereinafter also referred to as, simply, "storage stability"), and also exhibits excellent ejection property when the pigment dispersion is applied to an ink for inkjet recording.

The reason why the pigment dispersion of the invention can exhibit such effects is not clear, but the present inventors guess as follows.

By adding a rosin acid in the production of a pigment dispersion, the dispersibility of the pigment in the pigment dispersion can be enhanced. However, in general, there are many cases in which a rosin compound derived from a natural product is used as the rosin acid, and thus, the composition thereof is not fixed. Therefore, depending on the composition of the rosin acid, there may be a case in which favorable dispersibility is not obtained.

Regarding this matter, the present inventors have found that, when over a specific amount of a specific rosin acid is added to a pigment dispersion, dispersibility can be stably enhanced, and further, storage stability and ejection property when the pigment dispersion is applied to an ink for inkjet recording can also be enhanced, as compared with the case of using a conventional rosin compound, which is derived from a natural product, as it is.

Namely, in the invention, a pigment dispersion which has excellent dispersibility and excellent storage stability and also exhibits excellent ejection property when the pigment dispersion is applied to an ink for inkjet recording can be realized, by incorporating a rosin acid that includes at least one selected from the group consisting of abietic acid, salts of abietic acid, dihydroabietic acid, and salts of dihydroabietic acid, and by having a total content of abietic acid, salts of abietic acid, dihydroabietic acid, and salts of dihydroabietic acid of 50% by mass or higher, based on the whole rosin acid contained in the pigment dispersion.

[Rosin Acid]

The pigment dispersion of the invention contains a rosin acid including at least one selected from the group consisting of abietic acid, salts of abietic acid, dihydroabietic acid, and salts of dihydroabietic acid. Further, the total content of abietic acid, salts of abietic acid, dihydroabietic acid, and salts of dihydroabietic acid is 50% by mass or higher and 100% by mass or lower, based on the whole rosin acid contained in the pigment dispersion of the invention.

In this specification, the term "rosin acid" means a compound formed of at least one selected from the group consisting of abietic acid, salts of abietic acid, dihydroabietic acid, salts of dihydroabietic acid, neoabietic acid, salts of neoabietic acid, dehydroabietic acid, salts of dehydroabietic acid, tetrahydroabietic acid, salts of tetrahydroabietic acid, palustric acid, salts of palustric acid, levopimaric acid, salts of levopimaric acid, pimaric acid, salts of pimaric acid, isopimaric acid, salts of isopimaric acid, citronellic acid, and salts of citronellic acid, or a mixture thereof, and is a mixture of organic acids contained in the rosin compound.

The salt included in the rosin acid is preferably a metal salt, and more preferably a calcium salt.

In this specification, the amount of rosin acid means a value calculated in terms of rosin acid.

Here, the expression "a value calculated in terms of rosin acid" means a value calculated by adopting the mass of the substance itself, in the case of rosin acid, or a value calculated by adopting the mass of the partial structure derived from rosin acid included in the salt, in the case of a salt of rosin acid.

In the following, the structures of abietic acid, dihydroabietic acid, neoabietic acid, dehydroabietic acid, tetrahydroabietic acid, palustric acid, levopimaric acid, pimaric acid, isopimaric acid, and citronellic acid are shown.

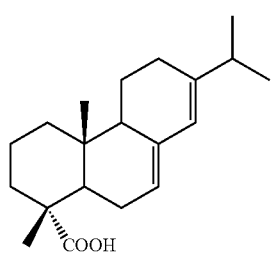

Abietic acid

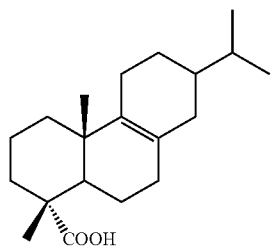

Dihydroabietic acid

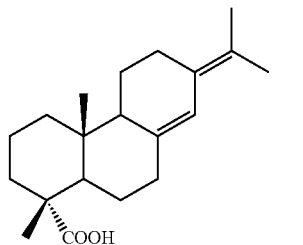

Neoabietic acid

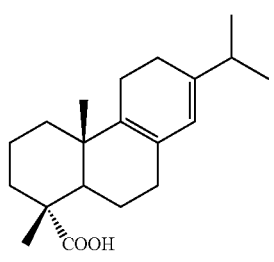

Palustric acid

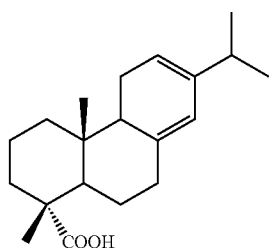

Levopimaric acid

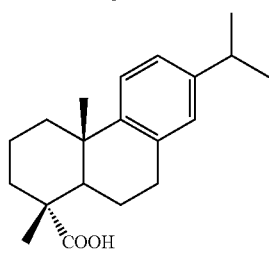

Dehydroabietic acid

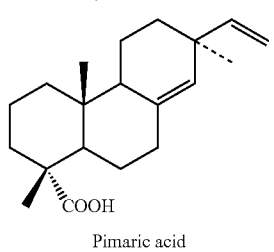

Pimaric acid

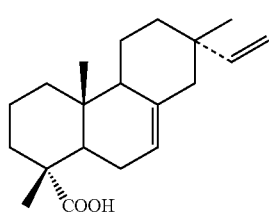

Isopimaric acid

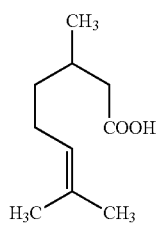

Citronellic acid

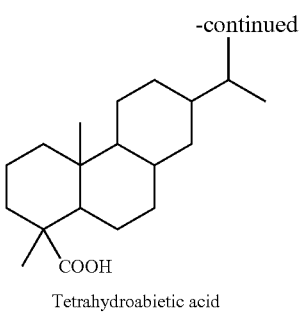
Tetrahydroabietic acid

Rosin acids are generally resin components extracted from pine resin, and the components incorporated and the ratio thereof differ according to the method of extraction. Representative examples of rosin acid include gum rosin, tall oil rosin, and wood rosin. The compositions of these rosin acids are shown in Table 1. Here, the numerical value in Table 1 represents the content (unit: % by mass) of each component in the rosin acid.

Among these rosin acids, gum rosin can be suitably used in the pigment dispersion of the invention.

TABLE 1

| | Conjugated resin acid | | | Non-conjugated resin acid | | |
|---|---|---|---|---|---|---|
| | Abietic acid | Neoabietic acid | Palustric acid | Pimaric acid | Isopimaric acid | Dehydroabietic acid |
| Tall oil rosin | 33-48 | 2-8 | 10-20 | 3-8 | 4-10 | 15-25 |
| Gum rosin | 25-45 | 10-25 | 10-25 | 4-8 | 2-8 | 3-7 |
| Wood rosin | 35-45 | 2-10 | 10-20 | 5-8 | 10-15 | 10-15 |

The pigment dispersion of the invention may contain one or more rosin acids other than abietic acid, a salt of abietic acid, dihydroabietic acid, or a salt of dihydroabietic acid, as long as the pigment dispersion contains a rosin acid including at least one selected from the group consisting of abietic acid, salts of abietic acid, dihydroabietic acid, and salts of dihydroabietic acid, and the total content of abietic acid, salts of abietic acid, dihydroabietic acid, and salts of dihydroabietic acid is 50% by mass or higher, based on the whole rosin acid contained in the pigment dispersion.

The rosin acid contained in the pigment dispersion of the invention may include only at least one selected from abietic acid or a salt of abietic acid, may include only at least one selected from dihydroabietic acid or a salt of dihydroabietic acid, or may include both at least one selected from abietic acid or a salt of abietic acid and at least one selected from dihydroabietic acid or a salt of dihydroabietic acid. Preferably, the rosin acid includes both at least one selected from abietic acid or a salt of abietic acid and at least one selected from dihydroabietic acid or a salt of dihydroabietic acid.

When the rosin acid contained in the pigment dispersion of the invention includes both at least one selected from abietic acid or a salt of abietic acid and at least one selected from dihydroabietic acid or a salt of dihydroabietic acid, the polymer-coated pigment in the pigment dispersion exhibits a narrower particle size distribution.

In this specification, the term "polymer-coated pigment" means a pigment in which at least a part of the surface is covered with a pigment dispersing polymer.

The total content of abietic acid, salts of abietic acid, dihydroabietic acid, and salts of dihydroabietic acid, based on the whole rosin acid contained in the pigment dispersion of the invention is 50% by mass or higher, preferably 55% by mass or higher, and more preferably 60% by mass or higher.

When the total content of abietic acid, salts of abietic acid, dihydroabietic acid, and salts of dihydroabietic acid, based on the whole rosin acid contained in the pigment dispersion is 50% by mass or higher, the pigment dispersion of the invention exhibits excellent dispersibility and excellent storage stability, and also exhibits excellent ejection property when the pigment dispersion is applied to an ink for inkjet recording.

The upper limit of the total content of abietic acid, salts of abietic acid, dihydroabietic acid, and salts of dihydroabietic acid, based on the whole rosin acid contained in the pigment dispersion of the invention is not particularly limited and, for example, the upper limit is preferably 100% by mass, more preferably 95% by mass, and still more preferably 90% by mass, from the viewpoint of dispersibility.

In a case in which the rosin acid includes both at least one selected from abietic acid or a salt of abietic acid and at least one selected from dihydroabietic acid or a salt of dihydroabietic acid, the ratio of the total content of dihydroabietic acid and salts of dihydroabietic acid relative to the total content of abietic acid and salts of abietic acid (total content of dihydroabietic acid and salts of dihydroabietic acid/total content of abietic acid and salts of abietic acid) is preferably from 0.1 to 1.0, more preferably from 0.15 to 0.95, and still more preferably from 0.65 to 0.86, on the basis of mass.

When the ratio of the total content of dihydroabietic acid and salts of dihydroabietic acid relative to the total content of abietic acid and salts of abietic acid, on the basis of mass, is within the above range, the pigment dispersion exhibits more excellent dispersibility and more excellent storage stability and also exhibits more excellent ejection property when the pigment dispersion is applied to an ink for inkjet recording.

The content of the rosin acid in the pigment dispersion of the invention is preferably from 0.25% by mass to 30.0% by mass, more preferably from 0.25% by mass to 10.0% by mass, still more preferably from 0.25% by mass to 8.0% by mass, and particularly preferably 0.25% by mass or higher but lower than 3.0% by mass, with respect to the total mass of the pigment.

When the content of the rosin acid in the pigment dispersion of the invention is 0.25% by mass or higher with respect to the total mass of the pigment, the dispersibility of the pigment dispersion can be further improved.

Further, when the content of the rosin acid in the pigment dispersion of the invention is 30.0% by mass or lower with respect to the total mass of the pigment, the storage stability of the pigment dispersion can be further improved, while keeping excellent dispersibility, and further, the ejection property when the pigment dispersion is applied to an ink for inkjet recording can also be improved.

The amount of the rosin acid contained in the pigment dispersion of the invention can be determined by performing quantification using a high performance liquid chromatograph.

The amounts of abietic acid, salts of abietic acid, dihydroabietic acid, and salts of dihydroabietic acid contained in the pigment dispersion of the invention can also be determined by substantially the same method.

—Conditions for High Performance Liquid Chromatograph—

Measuring device: high performance chromatograph CHROMASTER (registered trademark) (manufactured by Hitachi High-Tech Science Corporation)

Detector: CORONA (registered trademark) CAD (manufactured by ESA Biosciences, Inc.)

Column: SHIM-PACK SPR-H (trade name, manufactured by Shimadzu Corporation)

Column oven: 40° C.

Flow rate: 1.0 mL/min

Injection quantity: 10 µL

Sample: the pigment dispersion is dried under reduced pressure at ordinary temperature, then 40 mg of the solids thus obtained are dipped in 2 mL of methanol for 10 hours, and then, solids are removed by filtration using a 0.45 µm filter. The resulting solution is used.

[Pigment]

The pigment dispersion in the present invention contains pigments.

The pigment is not particularly limited and can be selected as appropriate according to the purpose. For example, the pigment may be an organic pigment or an inorganic pigment.

Examples of the organic pigment include azo pigments, polycyclic pigments, dye chelates, nitro pigments, nitroso pigments, and aniline black. Among them, azo pigments and polycyclic pigments are more preferable as the organic pigment. Examples of the azo pigments include azo lakes, insoluble azo pigments, condensed azo pigments, chelate azo pigments and the like. Examples of the polycyclic pigment include phthalocyanine pigments, perylene pigments, perinone pigments, anthraquinone pigments, quinacridone pigments, dioxazine pigments, indigo pigments, thio indigo pigments, isoindolinone pigments, quinophthalone pigments and the like. Examples of the dye chelates include basic dye chelates, acidic dye chelates and the like.

Examples of the inorganic pigment include titanium oxide, iron oxide, calcium carbonate, barium sulfate, aluminium hydroxide, barium yellow, cadmium red, chrome yellow, carbon black and the like. Among them, carbon black is particularly preferable as the inorganic pigment. The carbon black may be produced by a known method such as a contact method, a furnace method, a thermal method or the like.

Examples of commercialized carbon black include, but not limited to, RAVEN 7000, RAVEN 5750, RAVEN 5250, RAVEN 500 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060, and RAVEN 700 ("RAVEN": registered trademark, all manufactured by Columbian Carbon Company), REGAL 400R, REGAL 330R, REGAL 660R, MOGUL L, Black Pearls L, MONARCH 700, MONARCH 800, MONARCH 880, MONARCH 900, MONARCH 1000, MONARCH 1100, MONARCH 1300, and MONARCH 1400 ("MONARCH": registered trademark, all manufactured by Cabot Corporation), COLOR BLACK FW1, COLOR BLACK FW2, COLOR BLACK FW2V, COLOR BLACK 18, COLOR BLACK 182, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (all manufactured by ORION Engineered Carbons Co. Ltd.), No. 25, No. 33, No. 40, No. 45, No. 47, No. 52, No. 900, No. 2200B, No. 2300, MCF-88, MA600, MA7, MA8, and MA100 (all manufactured by Mitsubishi Chemical Corporation).

Examples of yellow pigments include C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180.

Examples of magenta pigments include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101 (red oxide), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269, and C. I. Pigment Violet 19. Among them, C. I. Pigment Red 122 is particularly preferable.

Examples of cyan pigments include C. I. Pigment Blue 1, 2, 3, 15, 15:1, 15:2, 15:3, 15:34, 16, 17:1, 22, 25, 56, 60, C. I. Vat Blue 4, 60, and 63. Among them, C. I. Pigment Blue 15:3 is particularly preferable.

These pigments may be used singly or in combination of two or more kinds thereof in the pigment dispersion in the invention.

As the pigment, a pigment added with a rosin acid may be used.

Specific examples of the pigment added with a rosin acid include FUJI FAST RED (trade name, manufactured by Fuji Pigment Co., Ltd.) and the like.

The content of the pigment in the pigment dispersion of the invention is preferably from 0.1% by mass to 20% by mass, more preferably from 0.3% by mass to 18% by mass, still more preferably from 0.5% by mass to 16% by mass, and particularly preferably from 0.8% by mass to 15% by mass, with respect to the total mass of the pigment dispersion, from the viewpoints of color forming properties, granularity, storage stability, and ejection property when the pigment dispersion is applied to an ink for inkjet recording.

[Pigment Dispersing Polymer]

The pigment dispersion of the invention contains a pigment dispersing polymer.

The pigment dispersing polymer may be a water soluble polymer or a water insoluble polymer.

In this specification, the term "water soluble polymer" means a polymer showing an amount of dissolution of 5.0 g or more, when the polymer is dried under reduced pressure at 105° C. for 2 hours, and then dissolved in 100 g of water at 25° C. The amount of dissolution is preferably 10.0 g or more, and more preferably 15.0 g or more.

From the viewpoint of the storage stability of the pigment dispersion, it is preferable that the pigment dispersing polymer is configured to include both at least one hydrophilic structural unit and at least one hydrophobic structural unit.

The "hydrophilic structural unit" refers to a structural unit containing at least one hydrophilic group.

The monomer that constitutes the hydrophilic structural unit is not particularly limited, as long as the monomer contains a hydrophilic group. Examples of the hydrophilic group include a nonionic group, a carboxyl group, a sulfonic acid group, and a phosphoric acid group.

Examples of the nonionic group include a hydroxyl group, an amido group (in which the nitrogen atom is unsubstituted), a group derived from an alkylene oxide polymer (polyethylene oxide, polypropylene oxide, or the like), and a group derived from sugar alcohol.

From the viewpoint of dispersibility, the hydrophilic structural unit is preferably a structural unit having an acidic group, and more preferably a structural unit having a carboxyl group.

Examples of the structural unit having a carboxyl group include structural units derived from (meth)acrylic acid, β-carboxyethyl (meth)acrylate, fumaric acid, itaconic acid, maleic acid, crotonic acid, or the like. Among them, a structural unit selected from a structural unit derived from (meth)acrylic acid or a structural unit derived from β-carboxyethyl (meth)acrylate is preferable, and a structural unit derived from (meth)acrylic acid is more preferable, as the structural unit having a carboxyl group.

Examples of the hydrophobic structural unit include a structural unit derived from (meth)acrylic ester and a structural unit derived from an aromatic group-containing monomer.

Among them, a structural unit derived from at least one selected from the group consisting of a (meth)acrylate having an alkyl group having from 1 to 20 carbon atoms, a derivative of a (meth)acrylate having an alkyl group having from 1 to 20 carbon atoms, benzyl (meth)acrylate, a derivative of benzyl (meth)acrylate, phenoxyethyl (meth)acrylate, and a derivative of phenoxyethyl (meth)acrylate is preferable, as the hydrophobic structural unit.

In a case in which the pigment dispersing polymer contains the hydrophobic structural unit, the pigment dispersing polymer may contain one kind of these hydrophobic structural units singly, or may contain two or more kinds thereof.

From the viewpoint of the storage stability of the pigment dispersion, it is preferable that the pigment dispersing polymer has a hydrophilic structural unit derived from (meth)acrylic acid and a hydrophobic structural unit derived from at least one selected from the group consisting of a (meth)acrylate having an alkyl group having from 1 to 20 carbon atoms, a derivative of a (meth)acrylate having an alkyl group having from 1 to 20 carbon atoms, benzyl (meth)acrylate, a derivative of benzyl (meth)acrylate, phenoxyethyl (meth)acrylate, and a derivative of phenoxyethyl (meth)acrylate.

Specific examples of the pigment dispersing polymer include a (meth)acrylic acid/benzyl (meth)acrylate copolymer, a (meth)acrylic acid/phenoxyethyl (meth)acrylate copolymer, and a copolymer of (meth)acrylic acid/phenoxyethyl (meth)acrylate/(meth)acrylate having an alkyl group having from 1 to 20 carbon atoms. Among them, a (meth)acrylic acid/benzyl (meth)acrylate copolymer is more preferably used.

The content ratio of the hydrophilic structural unit to the hydrophobic structural unit (hydrophilic structural unit:hydrophobic structural unit) in the pigment dispersing polymer is preferably in a range of from 15:85 to 40:60, and more preferably in a range of from 15:85 to 30:70.

The pigment dispersing polymer may be a polymer that has a crosslinking structure or may be a polymer that does not have a crosslinking structure. From the viewpoint of the storage stability of the pigment dispersion, it is preferable that the pigment dispersing polymer has a crosslinking structure.

From the viewpoint of the ejection property when the pigment dispersion is applied to an ink for inkjet recording, the acid value of the pigment dispersing polymer is preferably from 90 mgKOH/g to 150 mgKOH/g, and more preferably from 100 mgKOH/g to 120 mgKOH/g.

Note that, in this specification, the term "acid value" represents an acid value per 1 g of the solids of the pigment dispersing polymer, and can be determined by a potentiometric titration method in accordance with JIS K 0070 (1992).

The weight average molecular weight (Mw) of the pigment dispersing polymer is preferably from 1,000 to 100,000, more preferably from 3,000 to 50,000, and still more preferably from 5,000 to 40,000, from the viewpoint of dispersibility.

The weight average molecular weight (Mw) of the pigment dispersing polymer is a value measured by gel permeation chromatography (GPC) under the following conditions.

—Conditions—

Measuring device: high performance GPC HLC-8020 GPC (trade name, manufactured by Tosoh Corporation)

Detector: differential refractive index meter (RI) RI-8020 (trade name, manufactured by Tosoh Corporation)

Column: three columns of TSK GEL SUPER MULTI-PORE HZ-H (trade name, manufactured by Tosoh Corporation; 4.6 mmID×15 cm) are used.

Column temperature: 40° C.

Eluent: tetrahydrofuran (THF)

Sample concentration: 0.45% by mass

Injection quantity: 10 μL

Flow rate: 0.35 mL/min

A calibration curve is prepared from 8 samples of the "standard sample TSK standard, polystyrene": "F-40", "F-20", "F-4", "F-1", "A-5000", "A-2500", "A-1000", and "n-propylbenzene" (trade names, manufactured by Tosoh Corporation).

The ratio of the content of the pigment to the content of the pigment dispersing polymer (content of pigment:content of pigment dispersing polymer) in the pigment dispersion of the invention is preferably in a range of from 10:1 to 10:8, more preferably in a range of from 10:1 to 10:7, and still more preferably in a range of from 10:1 to 10:5, on the basis of mass.

[Water]

The pigment dispersion of the invention contains water.

Regarding the water, it is preferable to use water that does not contain ionic impurities, such as ion exchanged water or distilled water.

The content of water in the pigment dispersion of the invention is not particularly limited, and can be determined as appropriate according to the purpose. For example, from the viewpoints of dispersibility and ejection property when the pigment dispersion is applied to an ink for inkjet recording, the content of water is preferably from 40% by mass to 99% by mass, more preferably from 50% by mass to 95% by mass, and still more preferably from 60% by mass to 95% by mass, with respect to the total amount of the pigment dispersion.

<Surfactant>

The pigment dispersion in the invention may contain at least one of surfactant.

Dispersibility of the pigment dispersion may be improved by using the surfactant. Examples of the surfactant include nonionic surfactants, cationic surfactants, anionic surfactants, and betaine surfactants.

Examples of the surfactant preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. Further, amine oxide type amphoteric surfactants such as N, N-dimethyl-N-alkyl amine oxide are preferred as the surfactant.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, and the pigment dispersion in the invention is used as an ink, abrasion resistance of the image formed may be improved.

Among them, nonionic surfactants are preferable, and a compound having an acetylenol group is more preferable as the surfactant, in view that the dispersibility can be further improved. The compound having an acetylenol group is preferably an ethylene oxide adduct of acetylenediol.

Specific examples of the compound having an acetylenol group include 2,4,7,9-tetramethyl-5-decyne-4,7-diol, 3,6-dimethyl-4-octyne-3,6-diol, and 3,5-dimethyl-1-hexyn-3-ol.

A commercially available product can be used as the compound having an acetylenol group. Examples of a commercially available product of the compound having an acetylenol group include SURFYNOL (registered trademark) 82, SURFYNOL (registered trademark) 465, SURFYNOL (registered trademark) 485, DYNOL 604, and DYNOL 607 (all trade names, manufactured by Air Products & Chemicals), and OLFINE (registered trademark) STG and OLFINE (registered trademark) E1010 (all manufactured by Nissin Chemical Industry Co., Ltd.).

The HLB (Hydrophile-Lipophile Balance) value of the surfactant is preferably from 6 to 13, and more preferably from 8 to 13.

HLB is a value calculated from the GRIFFIN's HLB value (20 Mw/M, Mw=molecular weight of the hydrophilic moiety, M=molecular weight of the nonionic surfactant).

In a case in which the pigment dispersion of the invention contains a surfactant, the content of the surfactant is preferably from 5% by mass to 100% by mass, and more preferably from 5% by mass to 30% by mass, with respect to the total mass of the pigment.

<Urea>

The pigment dispersion of the invention may contain urea.

Since urea has a high moisturizing function, urea can be used as a wetting agent.

When the pigment dispersion of the invention contains urea, drying and coagulation can be effectively suppressed.

In a case in which the pigment dispersion of the invention contains urea, the content of urea is preferably from 3.5% by mass to 6.5% by mass, more preferably from 4.0% by mass to 6.0% by mass, and still more preferably from 4.5% by mass to 5.5% by mass, with respect to the total mass of the pigment dispersion, from the viewpoint of further improving the ejection property when the pigment dispersion is applied to an ink for inkjet recording.

<Water Soluble Organic Solvent>

The pigment dispersion of the invention may contain at least one water soluble organic solvent.

In this specification, the term "water soluble organic solvent" means an organic solvent showing an amount of dissolution of 5 g or more with respect to 100 g of water at 25° C. The amount of dissolution is preferably 10 g or more.

In a case in which the pigment dispersion of the invention is used as an ink for inkjet recording, the water soluble organic solvent can function as an anti-drying agent that prevents clogging of jetting nozzles, which may be caused due to adhesion and drying of ink at the ink discharge port.

For anti-drying, the water soluble organic solvent having a lower vapor pressure than that of water is preferable. Preferable examples of the water soluble organic solvent include polyhydric alcohols such as ethylene glycol, propylene glycol, dipropylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ether compounds of polyhydric alcohols, such as ethylene glycol monomethyl ether, ethylene glycol monoethyl ether, diethylene glycol monomethyl ether, diethylene glycol monoethyl ether, triethylene glycol monoethyl ether and triethylene glycol monobutyl ether; heterocyclic compounds such as 2-pyrrolidone, N-methyl-2-pyrrolidone, 1,3-dimethyl-2-imidazolidinone and N-ethyl morpholine; sulfur-containing compounds such as sulfolane, dimethyl sulfoxide and 3-sulfolene; polyfunctional compounds such as diacetone alcohol and diethanol amine; urea derivatives; and the like.

Among these water soluble organic solvents, polyhydric alcohols such as glycerin, diethylene glycol and the like are preferable as anti-drying agents.

In a case when the pigment dispersion in the invention includes the water soluble organic solvent as the anti-drying agents, the water soluble organic solvent may be used singly or in combination of two or more thereof. The content of the water soluble organic solvent is preferably from 10% by mass to 50% by mass with respect to a total mass of the pigment dispersion.

Further, the water soluble organic solvent may function as a penetration enhancing agent that enhances the properties of penetrating ink into a recording medium such as paper, in the case of using the pigment dispersion of the invention as an ink.

Specific examples of the water soluble organic solvent suitable as the penetration enhancing agent include alcohols such as ethanol, isopropanol, butanol, diethylene glycol monobutyl ether, triethylene glycol monobutyl ether, or 1,2-hexanediol; sodium lauryl sulfate; sodium oleate; and nonionic surfactants.

In a case in which the pigment dispersion of the invention contains the water soluble organic solvent as the penetration enhancing agent, the water soluble organic solvent may be used singly or in combination of two or more thereof.

In a case in which the pigment dispersion of the invention contains the water soluble organic solvent as the penetration enhancing agent, the content of the water soluble organic solvent is preferably within a range that does not cause image bleeding or paper through (print through). For example, the content of the water soluble organic solvent is preferably from 5% by mass to 30% by mass with respect to the total mass of the pigment dispersion.

Further, the water soluble organic solvent may function as a viscosity adjuster other than functions described above.

Specific examples of the preferable water soluble organic solvents as the viscosity adjuster include alcohols such as methanol, ethanol, propanol, isopropanol, butanol, isobutanol, sec-butanol, t-butanol, pentanol, hexanol, cyclohexanol, benzyl alcohol and the like; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol and the like; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, ethylene glycol diacetate, ethylene glycol monomethyl ether acetate, triethylene glycol monomethyl ether, triethylene glycol monoethyl ether, ethylene glycol monophenyl ether, polyoxypropylene glyceryl ether and the like; amines such as ethanolamine, diethanolamine, triethanolamine, N-methyldiethanolamine, N-ethyl diethanolamine, morpholine, N-ethylmorpholine, ethylenediamine, diethylenetriamine, triethylenetetramine, polyethylenimine, tetramethylpropylenediamine and the like; other polar solvents such as formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone and the like.

In a case in which the pigment dispersion of the invention contains the water soluble organic solvent as the viscosity adjuster, the water soluble organic solvent may be used singly or in combination of two or more thereof.

In a case in which the pigment dispersion of the invention contains the water soluble organic solvent as the viscosity adjuster, the content of the water soluble organic solvent may be determined as appropriate according to the desired viscosity.

<Other Additives>

As necessary, the pigment dispersion in the present invention may further include other additives in addition to the aforementioned components. Examples of the other additives include known additives such as a water-soluble polymerizable compound, a polymerization initiator, resin particles, an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent and a chelating agent and the like. These additives may be added directly to the pigment dispersion after preparation of the pigment dispersion, or during preparation of the pigment dispersion.

(pH Adjuster)

Examples of the pH adjuster include neutralizing agents (for example, an organic base or an inorganic alkali), and an inorganic alkali is preferable as the pH adjuster. The inorganic alkali is preferably a compound containing a monovalent alkali metal, and more preferably at least one selected from sodium hydroxide or potassium hydroxide.

<Physical Properties of Pigment Dispersion>

The pH of the pigment dispersion of the invention is preferably from 8.0 to 9.5, more preferably from 8.2 to 9.2, and still more preferably from 8.4 to 8.9.

When the pH of the pigment dispersion of the invention is within the above range, the pigment dispersion exhibits more excellent storage stability.

The above pH of the pigment dispersion of the invention indicates the pH of the pigment dispersion at a liquid temperature of 25° C., which is measured using a pH meter (model name: WM-50EG, manufactured by DDK-TOA CORPORATION).

<Use of Pigment Dispersion>

Since the pigment dispersion of the invention exhibits excellent dispersibility and excellent storage stability, and also exhibits excellent ejection property when the pigment dispersion is applied to an ink for inkjet recording, it is particularly preferable that the pigment dispersion is used as an ink for inkjet recording (namely, the pigment dispersion of the invention is an ink for inkjet recording).

[Method of Producing Pigment Dispersion]

The method of producing a pigment dispersion according to the invention is not particularly limited, as long as the pigment dispersion described above can be produced.

As the method of producing a pigment dispersion according to the invention, the method of producing a pigment dispersion according to the embodiment of the invention, which is described below, is preferable from the viewpoint that the pigment dispersion of the invention is obtained easily.

The method of producing a pigment dispersion according to the embodiment of the invention (hereinafter also referred to as "production method according to the embodiment of the invention") includes a mixing process of mixing water, a pigment, a pigment dispersing polymer, and a rosin acid including at least one selected from the group consisting of abietic acid, salts of abietic acid, dihydroabietic acid, and salts of dihydroabietic acid, to obtain a mixture liquid, in which the total content of abietic acid, salts of abietic acid, dihydroabietic acid, and salts of dihydroabietic acid is 50% by mass or higher, with respect to the content of the whole rosin acid; and a dispersion process of subjecting the mixture liquid obtained in the mixing process to a dispersion treatment, to obtain a dispersion.

According to the production method according to the embodiment of the invention, the pigment dispersion of the invention, which is described above, can be easily produced.

Hereinafter, the respective processes in the production method according to the embodiment of the invention are described in detail.

It should be noted that specific examples and preferable embodiments of the components used in the respective processes are the same as those described above in the paragraph on the pigment dispersion, and thus explanation is omitted here.

<Mixing Process>

The mixing process is a process of mixing water, a pigment, a pigment dispersing polymer, and a rosin acid including at least one selected from the group consisting of abietic acid, salts of abietic acid, dihydroabietic acid, and salts of dihydroabietic acid, to obtain a mixture liquid, in which the total content of abietic acid, salts of abietic acid, dihydroabietic acid, and salts of dihydroabietic acid is 50% by mass or higher, with respect to the content of the whole rosin acid.

In the mixing process, by mixing a pigment, a pigment dispersing polymer, and a rosin acid that includes over a specific amount of a specific rosin, wettability of the pigment surface is enhanced due to the specific rosin, and the pigment surface is efficiently covered with the pigment dispersing polymer. Accordingly, a pigment dispersion, which exhibits excellent dispersibility and excellent storage stability and also exhibits excellent ejection property when the pigment dispersion is applied to an ink for inkjet recording, can be finally obtained.

In the mixing process, at least one selected from the group consisting of abietic acid, salts of abietic acid, dihydroabietic acid, and salts of dihydroabietic acid can be separately blended, a rosin acid that serves as a mixture including at least one selected from the group consisting of abietic acid, salts of abietic acid, dihydroabietic acid, and salts of dihydroabietic acid may be blended, or both of them may be blended, as long as a mixture liquid can be obtained, in which the total content of abietic acid, salts of abietic acid, dihydroabietic acid, and salts of dihydroabietic acid is 50% by mass or higher, with respect to the content of the whole rosin acid.

Examples of the rosin acid that serves as a mixture including at least one selected from the group consisting of abietic acid, salts of abietic acid, dihydroabietic acid, and salts of dihydroabietic acid include gum rosin, tall oil rosin, and wood rosin. Among them, gum rosin is preferable.

The total content of abietic acid, salts of abietic acid, dihydroabietic acid, and salts of dihydroabietic acid is 50% by mass or higher, preferably 55% by mass or higher, and more preferably 60% by mass or higher, with respect to the content of the whole rosin acid in the mixture liquid.

When the total content of abietic acid, salts of abietic acid, dihydroabietic acid, and salts of dihydroabietic acid is 50% by mass or higher with respect to the content of the whole rosin acid in the mixture liquid, the wettability of the pigment surface is enhanced and the pigment surface is efficiently covered with the pigment dispersing polymer, and thus, a pigment dispersion which exhibits excellent dispersibility and excellent storage stability, and also exhibits excellent ejection property when the pigment dispersion is applied to an ink for inkjet recording can be obtained.

The upper limit of the total content of abietic acid, salts of abietic acid, dihydroabietic acid, and salts of dihydroabietic acid, with respect to the content of the whole rosin acid in the mixture liquid, is not particularly limited. For example, from the viewpoint of dispersibility, the upper limit is preferably 100% by mass, more preferably 95% by mass, and still more preferably 90% by mass.

In the case of blending both at least one selected from abietic acid or a salt of abietic acid and at least one selected from dihydroabietic acid or a salt of dihydroabietic acid, the ratio of the total blending amount of dihydroabietic acid and salts of dihydroabietic acid relative to the total blending amount of abietic acid and salts of abietic acid (total blending amount of dihydroabietic acid and salts of dihydroabietic acid/total blending amount of abietic acid and salts of abietic acid) is preferably from 0.1 to 1.0, more preferably from 0.15 to 0.95, and still more preferably from 0.65 to 0.86, on the basis of mass.

When the ratio of the total blending amount of dihydroabietic acid and salts of dihydroabietic acid relative to the total blending amount of abietic acid and salts of abietic acid is within the above range, a pigment dispersion which exhibits more excellent dispersibility and more excellent storage stability and also exhibits more excellent ejection property when the pigment dispersion is applied to an ink for inkjet recording can be obtained.

The amount of the rosin acid contained in the mixture liquid is preferably from 3.0% by mass to 30.0% by mass, more preferably from 3.0% by mass to 20.0% by mass, and still more preferably from 3.0% by mass to 15.0% by mass, with respect to the pigment.

When the amount of the rosin acid contained in the mixture liquid is 3.0% by mass or more with respect to the pigment, the wettability of the pigment surface can be sufficiently enhanced, and therefore, the pigment surface is efficiently covered with the pigment dispersing polymer and, as a result, a pigment dispersion having more excellent dispersibility can be obtained.

When the amount of the rosin acid contained in the mixture liquid is 30.0% by mass or less with respect to the pigment, gelation of the mixture liquid can be suppressed.

Further, when the amount of the rosin acid contained in the mixture liquid is within the above range with respect to the pigment, a pigment dispersion may be obtained, in which the polydispersity index (PDI) of the pigment, at least a part of the surface of the pigment being covered with a pigment dispersing polymer, (namely, the polymer-coated pigment) is within a preferable range. The polydispersity index (PDI) is described below.

The ratio of the blending amount of the pigment to the blending amount of the pigment dispersing polymer (blending amount of pigment:blending amount of pigment dispersing polymer) is preferably in a range of from 10:1 to 10:8, more preferably in a range of from 10:1 to 10:7, and still more preferably in a range of from 10:1 to 10:5, on the basis of mass.

In the mixing process, other than the water, the pigment, the pigment dispersing polymer, or the rosin acid containing at least one selected from the group consisting of abietic acid, salts of abietic acid, dihydroabietic acid, and salts of dihydroabietic acid, it is preferable to further blend and mix a surfactant.

By blending a surfactant, the wettability of the pigment surface is further improved, and a pigment dispersion having more excellent dispersibility can be obtained.

The surfactant is the same as that described above in the paragraph on the pigment dispersion, and thus explanation thereof is omitted here.

The blending amount of the surfactant is preferably from 5% by mass to 100% by mass, and more preferably from 5% by mass to 30% by mass, with respect to the total mass of the pigment.

In the mixing process, the order of mixing water, a pigment, a pigment dispersing polymer, and a rosin acid including at least one selected from the group consisting of abietic acid, salts of abietic acid, dihydroabietic acid, and salts of dihydroabietic acid is not particularly limited.

From the viewpoint of further improving the dispersibility of the pigment, it is preferable that the pigment and the rosin acid including at least one selected from the group consisting of abietic acid, salts of abietic acid, dihydroabietic acid, and salts of dihydroabietic acid are mixed, and then the resulting mixture is mixed with the pigment dispersing polymer. Namely, it is preferable that the mixing process includes a first step of mixing at least the pigment and the rosin acid including at least one selected from the group consisting of abietic acid, salts of abietic acid, dihydroabietic acid, and salts of dihydroabietic acid, to obtain a first liquid, and a second step of mixing the first liquid obtained in the first step and the pigment dispersing polymer, to obtain a second liquid. The second liquid corresponds to the mixture liquid in the above mixing process.

In the mixing process, the method of mixing the respective components is not particularly limited.

Mixing of the respective components in the mixing process can be carried out by using a two-roll mill, a three-roll mill, a ball mill, a tron mill, a disper, a kneader, a Co-Kneader, a homogenizer, a blender, a single-screw extruder, a twin-screw extruder, or the like.

For the details on the mixing method, description in "Paint Flow and Pigment Dispersion", written by T. C. Patton (published by John Wiley and Sons, 1964) and the like can be referred to.

<Dispersion Process>

The dispersion process is a process of subjecting the mixture liquid obtained in the above-described mixing process to a dispersion treatment, to obtain a dispersion.

In the dispersion process, by subjecting the mixture liquid obtained in the mixing process to a dispersion treatment, a dispersion in which a pigment, at least a part of the surface of the pigment being covered with a pigment dispersing polymer, (namely, a polymer-coated pigment) is dispersed can be obtained.

The polymer-coated pigment that is dispersed in the dispersion may be a polymer-coated pigment in which at least a part of the pigment surface is covered with a pigment dispersing polymer having a non-crosslinking structure (hereinafter also referred to as "non-crosslinked polymer coated pigment"), or may be a polymer-coated pigment in which at least a part of the pigment surface is covered with a pigment dispersing polymer having a crosslinking structure (hereinafter also referred to as "crosslinked polymer coated pigment"). From the viewpoint of storage stability, a crosslinked polymer coated pigment is preferable. Note that, in this specification, the non-crosslinked polymer coated pigment and the crosslinked polymer coated pigment are collectively referred to as "polymer-coated pigment".

An average particle diameter of the polymer-coated pigment in the dispersed state is preferably from 10 nm to 200 nm, more preferably from 50 nm to 150 nm, and still more preferably from 80 nm to 130 nm.

When the average particle diameter is 200 nm or less, color reproducibility is favorable, and droplet landing properties in discharging the pigment dispersion by an inkjet method are favorable. When the average particle diameter is 10 nm or more, lightfastness is favorable.

The average particle diameter of the polymer-coated pigment in the dispersed state can be determined by measuring the volume average particle diameter using a Nanotrac particle size distribution analyzer UPA-EX150 (trade name, manufactured by Nikkiso Co., Ltd.), in accordance with a dynamic light scattering method.

As an index for evaluating the dispersibility of the polymer-coated pigment, a polydispersity index (PDI) is described.

In this specification, the "polydispersity index (PDI)" is an index for defining the particle size distribution of dispersed particles, and is defined by the following Equation (1).

$$PDI=(D90-D10)/D50: \quad \text{Equation (1)}$$

In Equation (1), D90, D50, and D10 represent particle diameters in which the integrated value from D=0 of the distribution function dG=F(D)dD is equal to 0.9 (90% by number), 0.5 (50% by number), and 0.1 (10% by number) with respect to the integrated value for the total number of particles, respectively. Here, G represents the number of dispersed particles, and D represents the particle diameter of the dispersed particles.

Note that, D90, D50, and D10 can be estimated from the particle diameter distribution measured by using a Nanotrac particle size distribution analyzer UPA-EX150 (trade name, manufactured by Nikkiso Co., Ltd.), in accordance with a dynamic light scattering method. In the measurement, the pigment concentration is adjusted to 0.75% by mass, and measurement is performed at 25° C.

In the above relational expression, as the particle size distribution becomes narrower, the PDI becomes closer to 1.0. On the contrary, as the particle size distribution becomes wider, namely, as the polydispersity becomes greater, the PDI becomes greater.

The polydispersity index (PDI) of the polymer-coated pigment is preferably from 1.10 to 1.45, more preferably from 1.15 to 1.30, and still more preferably from 1.15 to 1.25.

In the dispersion process, the method of subjecting the mixture liquid obtained in the mixing process to a dispersion treatment is not particularly limited and, for example, dispersion using a dispersion device is described.

Examples of the dispersion device include a ball mill, a bead mill, a sand mill, a salt mill, an attritor, a roll mill, an agitator, a Henschel mixer, a colloid mill, an ultrasonic homogenizer, a pearl mill, a wet jet mill, and a paint shaker.

Among them, a bead mill dispersion device is preferable in view that a dispersion having excellent dispersibility can be obtained.

In the dispersion using a bead mill dispersion device, by using beads having an average particle diameter of, preferably, from 0.01 mm to 3.0 mm, more preferably from 0.05 mm to 1.5 mm, and still more preferably from 0.1 mm to 1.0 mm, a dispersion having more excellent dispersibility can be obtained.

<Additional Process>

The production method according to the embodiment of the invention may have one or more additional processes other than the mixing process or the dispersion process, if necessary, as long as the effects of the invention are not impaired.

Examples of the additional processes include a pH adjustment process, a crosslinking process, and a decrease process.

(pH Adjustment Process)

It is preferable that the production method according to the embodiment of the invention further has a pH adjustment process of adjusting the pH of the mixture liquid obtained in the mixing process to a pH within a range of from 8.0 to 9.5, using an aqueous solution containing a monovalent alkali metal, from the viewpoint of obtaining a pigment dispersion having more excellent storage stability.

The aqueous solution containing a monovalent alkali metal is not particularly limited and, for example, an aqueous solution of sodium hydroxide or an aqueous solution of potassium hydroxide is preferably used.

In the pH adjustment process, the pH of the mixture liquid is preferably adjusted to a pH within a range of from 8.2 to 9.2, and is more preferably adjusted to a pH within a range of from 8.4 to 9.0.

The method of measuring the pH is the same as that described in the above paragraph on the pigment dispersion, and thus explanation thereof is omitted here.

(Crosslinking Process)

In a case in which the pigment dispersing polymer has a functional group capable of forming a crosslinking structure such as a carboxyl group, an isocyanato group, or an epoxy group, it is preferable that the production method according to the embodiment of the invention further has a crosslinking process of crosslinking the polymer (namely, the pigment dispersing polymer) of the polymer-coated pigment that is dispersed in the dispersion, after the dispersion process, from the viewpoint of storage stability of the pigment dispersion.

It is enough that the crosslinking process is performed after the dispersion process, and the crosslinking process may be performed before or after the decrease process.

Crosslinking of the pigment dispersing polymer may be self-crosslinking of the polymer itself, may be crosslinking using a crosslinking agent, or may include both of them.

In the crosslinking process, for example, it is preferable to crosslink between the polymer molecules, using a crosslinking agent, as described below.

The dispersion obtained in the dispersion process is heated, which is being stirred, such that the liquid temperature of the dispersion reaches a temperature within a range of from 60° C. to 80° C. Subsequently, a crosslinking agent is added, and the mixture is heated for 6 hours, which is being stirred, such that the liquid temperature is maintained at a temperature within a range of from 60° C. to 80° C., thereby performing crosslinking between the polymer molecules of the polymer-coated pigment that is dispersed in the dispersion. Thereafter, the liquid temperature is cooled to 25° C., whereby a dispersion of a crosslinked polymer coated pigment is obtained.

Here, in the crosslinking process, the liquid temperature of the dispersion is preferably from 70° C. to 80° C.

The crosslinking agent is not particularly limited, as long as the crosslinking agent is a compound having two or more moieties that react with the pigment dispersing polymer. For example, the crosslinking agent is preferably a compound having two or more epoxy groups (an epoxy compound having a functionality of two or higher).

Specific examples of the crosslinking agents include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, trimethylol propane triglycidyl ether and the like. Among them, at least one crosslinking agent selected from the group consisting of polyethylene glycol diglycidyl ether, diethylene glycol diglycidyl ether and trimethylol propane triglycidyl ether is preferable.

A commercially available product can also be used as the crosslinking agent. Examples of the commercially available product which can be used include DENACOL (registered trademark) EX-321, EX-521, EX-821, EX-830, EX-850, and EX-851 (all manufactured by Nagase Chemtex Corporation).

The mole ratio of the crosslinking moieties of the crosslinking agent to the moieties of the pigment dispersing polymer, the moieties being to be crosslinked, is preferably from 1:1.1 to 1:10, more preferably from 1:1.1 to 1:5, and still more preferably from 1:1.1 to 1:3, from the viewpoints of the crosslinking reaction rate and the storage stability of the pigment dispersion after crosslinking.

(Decrease Process)

It is preferable that the production method according to the embodiment of the invention further has a decrease process of decreasing the amount of the rosin acid, which is included in the dispersion obtained in the dispersion process, to less than 3.0% by mass with respect to the total mass of the pigment, from the viewpoint of obtaining a pigment dispersion having more excellent storage stability.

In the decrease process, by decreasing the amount of the rosin acid, which has been added in the mixing step in order to improve the dispersibility of the pigment, to less than 3.0% by mass in the decrease process, a pigment dispersion which exhibits more excellent storage stability, while keeping more excellent dispersibility, and also exhibits more excellent ejection property when the pigment dispersion is applied to an ink for inkjet recording can be obtained.

In the decrease process, it is preferable to decrease the amount of the rosin acid to 0.25% by mass or more but less than 3.0% by mass, with respect to the total mass of the pigment.

The amount of the rosin acid is preferably decreased to 50% by mass or less, more preferably from 0.83% by mass to 40% by mass, of the amount added in the mixing step.

When the amount of the rosin acid is 0.25% by mass or more, the dispersibility of the pigment dispersion can be further improved.

Note that, the "amount of the rosin acid" used herein also includes the amount of rosin acid added to the pigment.

Further, in the decrease process, the amount of the rosin acid is decreased such that, among the rosin acid that has been decreased, the total amount of dihydroabietic acid and salts of dihydroabietic acid is preferably decreased to 1.5% by mass or less, more preferably 1.0% by mass or less, and still more preferably 0.5% by mass or less, with respect to the total mass of the pigment.

In the decrease process, the method of decreasing the amount of rosin acid is not particularly limited, and a method such as a conventionally known concentration method such as ultrafiltration, pressure filtration, acid deposition, centrifugal separation, or vacuum distillation, a desalting method, or a desolventizing method can be used. Among them, as the method of decreasing the amount of rosin acid, a concentration method by ultrafiltration is preferable in view that the rosin acid can be selectively removed such that the amount of the rosin acid is decreased to a predetermined amount.

Here, the "ultrafiltration" is a method of filtration objecting dispersed particles having a sub-micron size in a solution and the like, and includes subjecting a solution containing dispersed particles to sieving in a molecular level, according to the pore size of the membrane and the molecular size of the solute, using a membrane filter having fine pores, and performing separation of the solute, fractionation, concentration, purification, and the like. As the ultrafiltration system, a full flow filtration system and a crossflow system are described. In the production method according to the embodiment of the invention, it is preferable to use a crossflow system.

In general, examples of the shape of the membrane filter used for ultrafiltration include a plane-like shape, a pipe-like shape, and a hollow yarn-like shape. Examples of a material of the membrane filter include synthetic polymers such as polyether sulfone (PESU) or polyacrylonitrile, and ceramics. The material of the membrane filter may be selected according to the intended use.

In the decrease process, in the case of using ultrafiltration as the method of decreasing the amount of rosin acid, the material of the membrane filter is preferably polyether sulfone (PESU). Further, the pore size of the membrane filter is preferably 0.2 μm or less, and more preferably from 0.1 μm to 0.2 μm.

In the ultrafiltration, the dispersion is charged into a storage tank for diafiltration and, while stirring with a magnetic stirrer, liquid transfer is performed using a tube pump. The flow rate at the time of filtration is preferably from 400 mL/min to 700 mL/min, and more preferably from 600 mL/min to 700 mL/min. During the liquid transfer, the liquid temperature is kept at 25° C., and ultrapure water in a quantity equal to the quantity of the liquid that has been filtered off is supplied such that the concentration is kept constant. The number of times of filtration in the decrease process differs according to the washing efficiency of the liquid to be filtered. For example, filtration is performed using ultrapure water in an amount approximately ten times the amount of the dispersion charged, in terms of volume magnification. The number of times of filtration is preferably from 8 times to 14 times, and more preferably from 10 times to 14 times, when counting the number of times with one volume magnification designated as one time.

EXAMPLES

Hereinafter, the present invention is specifically described with reference to Examples. The invention is by no means limited to the following Examples unless they are beyond the spirit of the invention.

The weight average molecular weights (Mw) of the pigment dispersing polymers synthesized in the Examples were measured by gel permeation chromatography (GPC) under the following conditions.

—Conditions—

Measuring device: high performance GPC HLC-8020 GPC (trade name, manufactured by Tosoh Corporation)

Detector: differential refractive index meter (RI) RI-8020 (trade name, manufactured by Tosoh Corporation)

Column: three columns of TSK GEL SUPER MULTIPORE HZ-H (trade name, manufactured by Tosoh Corporation; 4.6 mmID×15 cm) are used.

Column temperature: 40° C.

Eluent: tetrahydrofuran (THF)

Sample concentration: 0.45% by mass

Injection quantity: 10 μL

Flow rate: 0.35 mL/min

A calibration curve was prepared from 8 samples of the "standard sample TSK standard, polystyrene": "F-40", "F-20", "F-4", "F-1", "A-5000", "A-2500", "A-1000", and "n-propylbenzene" (trade names, manufactured by Tosoh Corporation).

The acid values of the pigment dispersing polymers synthesized in the Examples were measured in accordance with the method described in JIS Standards (JIS K 0070, 1992).

Synthesis Examples

[Synthesis of Pigment Dispersing Polymer P-1]

Pigment dispersing polymer P-1 was synthesized according to the following method.

Methacrylic acid (170 parts by mass), benzyl methacrylate (830 parts by mass), and isopropanol (375 parts by mass) were mixed, thereby preparing a monomer supplying composition.

Further, 2,2-azobis(2-methylbutylonitrile) (22.05 parts by mass) and isopropanol (187.5 parts by mass) were mixed, thereby preparing an initiator supplying composition.

Subsequently, a mixture of the above monomer supplying composition and the above initiator supplying composition were added dropwise into isopropanol (187.5 parts by mass), which had been heated to 80° C., over two hours under nitrogen atmosphere. After the completion of the dropwise addition, the resulting mixture was kept at 80° C. for 4 hours, and then cooled to 25° C.

After cooling, the solvent was removed under reduced pressure, to obtain pigment dispersing polymer P-1.

The weight average molecular weight (Mw) of the obtained pigment dispersing polymer P-1 was 29,000, and the acid value was 110.8 mgKOH/g.

[Synthesis of Pigment Dispersing Polymer P-2]

Synthesis of pigment dispersing polymer P-2 was conducted in a manner substantially similar to that in the synthesis of P-1, except that the blending amount of methacrylic acid in the synthesis of P-1 was changed from 170 parts by mass to 265 parts by mass, and the blending amount of benzyl methacrylate was changed from 830 parts by mass to 735 parts by mass.

The weight average molecular weight (Mw) of the obtained pigment dispersing polymer P-2 was 31,000, and the acid value was 172.8 mgKOH/g.

[Synthesis of Pigment Dispersing Polymer P-3]

Synthesis of pigment dispersing polymer P-3 was conducted in a manner substantially similar to that in the synthesis of P-1, except that the blending amount of methacrylic acid in the synthesis of P-1 was changed from 170 parts by mass to 100 parts by mass, and the blending amount of benzyl methacrylate was changed from 830 parts by mass to 570 parts by mass.

The weight average molecular weight (Mw) of the obtained pigment dispersing polymer P-3 was 28,000, and the acid value was 65.1 mgKOH/g.

[Preparation of Pigment Dispersion]

Example 1

150 parts by mass of the pigment dispersing polymer P-1 obtained as described above were dissolved in water, to prepare an aqueous pigment dispersing polymer solution such that the concentration of the pigment dispersing polymer was about 25% by mass.

180 parts by mass of this aqueous pigment dispersing polymer solution, 2.58 parts by mass of gum rosin [natural rosin; composition: abietic acid (35% by mass), neoabietic acid (24% by mass), palustric acid (22% by mass), dehydroabietic acid (6% by mass), pimaric acid (6% by mass), and isopimaric acid (7% by mass); manufactured by Arakawa Chemical Industries, Ltd.], 0.80 parts by mass of abietic acid (purity: 93% by mass; the impurities in an amount of 7% by mass include other rosin acid except dihydroabietic acid; manufactured by Wako Pure Chemical Industries, Ltd.), 1.11 parts by mass of dihydroabietic acid (purity: 100% by mass; manufactured by Wako Pure Chemical Industries, Ltd.), 90 parts by mass of PR-122 (CHROMOFINE (registered trademark) RED, manufactured by Dainichiseika Color & Chemicals Mfg, Co., Ltd.), and 170.0 parts by mass of water were mixed, to obtain a mixture liquid. To the mixture liquid thus obtained, an aqueous solution of potassium hydroxide was added, such that the pH of the mixture liquid after neutralization was 8.7. Note that, the pH is a value measured at 25° C., using a pH meter (model name: WM-50EG, manufactured by DDK-TOA CORPORATION), and the same applies to the pH in the preparation of the pigment dispersion described below.

Subsequently, with respect to the mixture liquid after neutralization, dispersion treatment was conducted for 3 hours, using a bead mill (diameter of beads: 0.1 mmφ, zirconia beads). As a result of this dispersion treatment, a dispersion of a non-crosslinked polymer coated pigment, the dispersion having a pigment solids concentration of 15% by mass, was obtained.

Ion exchanged water was added to the dispersion thus obtained, such that the pigment concentration was 15% by mass. In this way, a pigment dispersion of Example 1 (pigment dispersion 1) was obtained.

Examples 2 to 11, 15, and 17

Pigment dispersions of Examples 2 to 11, 15, and 17 (pigment dispersions 2 to 11, 15 and 17) were obtained in a manner substantially similar to that in the preparation of pigment dispersion 1, except that the blending amounts of gum rosin, abietic acid, and dihydroabietic acid, the kind of pigment dispersing polymer, and the pH were changed as shown in Table 2.

Example 12

150 parts by mass of the pigment dispersing polymer P-1 obtained as described above were dissolved in water, to prepare an aqueous pigment dispersing polymer solution such that the concentration of the pigment dispersing polymer was about 40% by mass.

180 parts by mass of this aqueous pigment dispersing polymer solution, 4.88 parts by mass of gum rosin (natural rosin; the composition is the same as that in Example 1; manufactured by Arakawa Chemical Industries, Ltd.), 1.65 parts by mass of abietic acid (purity: 93% by mass; the impurities in an amount of 7% by mass include other rosin acid except dihydroabietic acid; manufactured by Wako Pure Chemical Industries, Ltd.), 2.51 parts by mass of dihydroabietic acid (manufactured by Wako Pure Chemical Industries, Ltd.), 90 parts by mass of PY-74 (CHROMOFINE (registered trademark) YELLOW, manufactured by Dainichiseika Color & Chemicals Mfg, Co., Ltd.), and 170.0 parts by mass of water were mixed, to obtain a mixture liquid. To the mixture liquid thus obtained, an aqueous solution of potassium hydroxide was added, such that the pH of the mixture liquid after neutralization was 8.7.

Subsequently, with respect to the mixture liquid after neutralization, dispersion treatment was conducted for 3 hours, using a bead mill (diameter of beads: 0.1 mmφ, zirconia beads). As a result of this dispersion treatment, a dispersion of a non-crosslinked polymer coated pigment, the dispersion having a pigment solids concentration of 15% by mass, was obtained.

Ion exchanged water was added to the dispersion thus obtained, such that the pigment concentration was 15% by mass. In this way, a pigment dispersion of Example 12 (pigment dispersion 12) was obtained.

Example 13

150 parts by mass of the pigment dispersing polymer P-1 obtained as described above were dissolved in water, to prepare an aqueous pigment dispersing polymer solution such that the concentration of the pigment dispersing polymer was about 25% by mass.

180 parts by mass of this aqueous pigment dispersing polymer solution, 2.58 parts by mass of gum rosin (natural rosin; the composition is the same as that in Example 1; manufactured by Arakawa Chemical Industries, Ltd.), 0.80 parts by mass of abietic acid (purity: 93% by mass; the impurities in an amount of 7% by mass include other rosin acid except dihydroabietic acid; manufactured by Wako Pure Chemical Industries, Ltd.), 1.11 parts by mass of dihydroabietic acid (manufactured by Wako Pure Chemical Industries, Ltd.), 90 parts by mass of PR-122 (CHROMOFINE (registered trademark) RED, manufactured by Dainichiseika Color & Chemicals Mfg, Co., Ltd.), and 170.0 parts by mass of water were mixed, to obtain a mixture liquid. To the mixture liquid thus obtained, an aqueous solution of potassium hydroxide was added, such that the pH of the mixture liquid after neutralization was 8.5.

Subsequently, with respect to the mixture liquid after neutralization, dispersion treatment was conducted for 3 hours, using a bead mill (diameter of beads: 0.1 mmφ, zirconia beads). As a result of this dispersion treatment, a dispersion of a non-crosslinked polymer coated pigment, the dispersion having a pigment solids concentration of 15% by mass, was obtained.

Ion exchanged water was added to the dispersion thus obtained, such that the pigment concentration was 15% by mass, thereby obtaining a pigment dispersion.

The pigment dispersion thus obtained was allowed to flow within an ultrafiltration device (crossflow type ultrafilter (UF), manufactured by Sartorius AG) equipped with a polyether sulfone (PESU) membrane (pore size: 0.1 µm), at a flow rate of 600 mL per 1 minute. In this process, the liquid temperature was adjusted to 25° C., and ultrafiltration was carried out 10 times, when counting the number of times with one volume magnification of the charged liquid designated as one time. In this way, a pigment dispersion of Example 13 (pigment dispersion 13) was obtained.

Example 14

150 parts by mass of the pigment dispersing polymer P-1 obtained as described above were dissolved in water, to prepare an aqueous pigment dispersing polymer solution such that the concentration of the pigment dispersing polymer was about 25% by mass.

180 parts by mass of this aqueous pigment dispersing polymer solution, 94.5 parts by mass of Pigment Red (Ca rosinate-added PR)-122 (trade name: FUJI FAST RED, manufactured by Fuji Pigment Co., Ltd.; the addition amount of Ca rosinate with respect to the pigment: 5% by mass) which is added with Ca rosinate [composition: calcium dehydroabietate (8% by mass), calcium dihydroabietate (24% by mass), calcium abietate (36% by mass), and calcium tetrahydroabietate (32% by mass); the numerical values in the parentheses are all values calculated in terms of rosin acid], and 170.0 parts by mass of water were mixed, to obtain a mixture liquid. To the mixture liquid thus obtained, an aqueous solution of potassium hydroxide was added, such that the pH of the mixture liquid after neutralization was 8.3.

Subsequently, with respect to the mixture liquid after neutralization, dispersion treatment was conducted for 3 hours, using a bead mill (diameter of beads: 0.1 mmφ, zirconia beads). As a result of this dispersion treatment, a dispersion of a non-crosslinked polymer coated pigment, the dispersion having a pigment solids concentration of 15% by mass, was obtained.

Ion exchanged water was added to the dispersion thus obtained, such that the pigment concentration was 15% by mass. In this way, a pigment dispersion of Example 14 (pigment dispersion 14) was obtained.

Example 16

150 parts by mass of the pigment dispersing polymer P-1 obtained as described above were dissolved in water, to prepare an aqueous pigment dispersing polymer solution such that the concentration of the pigment dispersing polymer was about 25% by mass.

180 parts by mass of this aqueous pigment dispersing polymer solution, 2.58 parts by mass of gum rosin (natural rosin; the composition is the same as that in Example 1; manufactured by Arakawa Chemical Industries, Ltd.), 0.80 parts by mass of abietic acid (purity: 93% by mass, the impurities in an amount of 7% by mass include other rosin acid except dihydroabietic acid; manufactured by Wako Pure Chemical Industries, Ltd.), 1.11 parts by mass of dihydroabietic acid (manufactured by Wako Pure Chemical Industries, Ltd.), 90 parts by mass of PR-122 (CHROMOFINE (registered trademark) RED, manufactured by Dainichiseika Color & Chemicals Mfg, Co., Ltd.), and 170.0 parts by mass of water were mixed, to obtain a mixture liquid. To the mixture liquid thus obtained, an aqueous solution of potassium hydroxide was added, such that the pH of the mixture liquid after neutralization was 8.6.

Subsequently, with respect to the mixture liquid after neutralization, dispersion treatment was conducted for 3 hours, using a bead mill (diameter of beads: 0.1 mmφ, zirconia beads). As a result of this dispersion treatment, a dispersion of a non-crosslinked polymer coated pigment, the dispersion having a pigment solids concentration of 15% by mass, was obtained.

To 136 parts by mass of the thus obtained dispersion of a non-crosslinked polymer coated pigment, 0.23 parts by mass of DENACOL (registered trademark) EX321 (crosslinking agent, manufactured by Nagase Chemtex Corporation) and 14.3 parts by mass of an aqueous solution of boric acid (boric acid concentration: 4% by mass) were added, and the mixture was allowed to react at 70° C. for 6 hours. After the completion of the reaction, the resulting reaction liquid was cooled to 25° C., to obtain a dispersion of a crosslinked polymer coated pigment.

Ion exchanged water was added to the dispersion thus obtained, such that the pigment concentration was 15% by mass. In this way, a pigment dispersion of Example 16 (pigment dispersion 16) was obtained.

Comparative Example 1

150 parts by mass of the pigment dispersing polymer P-1 obtained as described above were dissolved in water, to prepare an aqueous pigment dispersing polymer solution such that the concentration of the pigment dispersing polymer was about 25% by mass.

180 parts by mass of this aqueous pigment dispersing polymer solution, 90 parts by mass of PR-122 (CHROMOFINE (registered trademark) RED, manufactured by Dainichiseika Color & Chemicals Mfg, Co., Ltd.), and 180.0 parts by mass of water were mixed, to obtain a mixture liquid. To the mixture liquid thus obtained, an aqueous solution of potassium hydroxide was added, such that the pH of the mixture liquid after neutralization was 8.5.

Subsequently, with respect to the mixture liquid after neutralization, dispersion treatment was conducted for 3 hours, using a bead mill (diameter of beads: 0.1 mmφ, zirconia beads). As a result of this dispersion treatment, a dispersion of a non-crosslinked polymer coated pigment, the dispersion having a pigment solids concentration of 15% by mass, was obtained.

Ion exchanged water was added to the dispersion thus obtained, such that the pigment concentration was 15% by mass. In this way, a pigment dispersion of Comparative Example 1 (comparative pigment dispersion 1) was obtained.

Comparative Examples 2 to 5

Pigment dispersions of Comparative Examples 2 to 5 (comparative pigment dispersions 2 to 5) were obtained in a manner substantially similar to that in the preparation of pigment dispersion 1, except that the blending amounts of gum rosin, abietic acid, dihydroabietic acid, and pimaric acid, and the pH were changed as shown in Table 2.

The compositions of the pigment dispersions of Examples 1 to 17 (pigment dispersions 1 to 17) and pigment dispersions of Comparative Examples 1 to 5 (comparative pigment dispersions 1 to 5) obtained as described above are shown in Table 2.

Note that, in Table 2, "AA" represents "abietic acid and salts of abietic acid", and "DiHA" represents "dihydroabietic acid and salts of dihydroabietic acid".

In Table 2, the "content ratio (DiHA/AA)" means the ratio (on the basis of mass) of the total content of dihydroabietic acid and salts of dihydroabietic acid relative to the total content of abietic acid and salts of abietic acid.

TABLE 2

| | | Pig. | Pig. disp. Polm. | | | | Rosin acid | | | | | |
| | | | | | | | | Blending amounts | | | | |
| | | | | Acid V. | R. Cont. | A/D. Cont. | Cont. Rat. | [parts by mass] | | | | |
| | | Kind | Struct. | mgKOH/g | [mass %] | [mass %] | DiHA/AA | G.R | DiHA | AA | Pim.A | pH |
|---|---|---|---|---|---|---|---|---|---|---|---|---|
| Example 1 | P.D. 1 | PR-122 | P-1 | 110.8 | 5.0 | 61.4 | 0.67 | 2.58 | 1.11 | 0.80 | 0.00 | 8.7 |
| Example 2 | P.D. 2 | PR-122 | P-1 | 110.8 | 5.0 | 61.3 | 0.15 | 2.52 | 0.36 | 1.66 | 0.00 | 8.7 |
| Example 3 | P.D. 3 | PR-122 | P-1 | 110.8 | 5.0 | 77.5 | 0.87 | 1.40 | 1.62 | 1.48 | 0.00 | 8.5 |
| Example 4 | P.D. 4 | PR-122 | P-1 | 110.8 | 5.0 | 61.4 | 0.67 | 2.58 | 1.11 | 0.80 | 0.00 | 8.9 |
| Example 5 | P.D. 5 | PR-122 | P-1 | 110.8 | 5.0 | 61.4 | 0.67 | 2.58 | 1.11 | 0.80 | 0.00 | 7.9 |
| Example 6 | P.D. 6 | PR-122 | P-1 | 110.8 | 5.0 | 61.4 | 0.67 | 2.58 | 1.11 | 0.80 | 0.00 | 9.8 |
| Example 7 | P.D. 7 | PR-122 | P-2 | 172.8 | 5.0 | 61.4 | 0.67 | 2.58 | 1.11 | 0.80 | 0.00 | 8.5 |
| Example 8 | P.D. 8 | PR-122 | P-3 | 65.1 | 5.0 | 61.4 | 0.67 | 2.58 | 1.11 | 0.80 | 0.00 | 8.5 |
| Example 9 | P.D. 9 | PR-122 | P-1 | 110.8 | 5.0 | 61.4 | 0.67 | 2.58 | 1.11 | 0.80 | 0.00 | 8.4 |
| Example 10 | P.D. 10 | PR-122 | P-1 | 110.8 | 50.0 | 61.7 | 0.67 | 25.63 | 11.11 | 8.26 | 0.00 | 8.4 |
| Example 11 | P.D. 11 | PR-122 | P-1 | 110.8 | 5.0 | 91.9 | 1.54 | 0.39 | 2.51 | 1.61 | 0.00 | 8.5 |
| Example 12 | P.D. 12 | PY-74 | P-1 | 110.8 | 10.0 | 63.4 | 0.76 | 4.88 | 2.47 | 1.65 | 0.00 | 8.7 |
| Example 13 | P.D. 13 | PR-122 | P-1 | 110.8 | 0.40 | 61.4 | 0.67 | 2.58 | 1.11 | 0.80 | 0.00 | 8.5 |
| Example 14 | P.D. 14 | PR-122 (R.C.P) | P-1 | 110.8 | 5.0 | 60.0 | 0.67 | 0.00 | 0.00 | 0.00 | 0.00 | 8.3 |
| Example 15 | P.D. 15 | PR-122 | P-1 | 110.8 | 1.5 | 91.7 | 0.67 | 0.09 | 0.50 | 0.76 | 0.00 | 8.4 |
| Example 16 | P.D. 16 | PR-122 | P-1 | 110.8 | 5.0 | 61.4 | 0.67 | 2.58 | 1.11 | 0.80 | 0.00 | 8.6 |
| Example 17 | P.D. 17 | PR-122 | P-1 | 110.8 | 5.0 | 52.5 | 0.67 | 3.26 | 0.95 | 0.29 | 0.00 | 8.6 |
| C. Example 1 | C.P.D. 1 | PR-122 | P-1 | 110.8 | 0.0 | 0.0 | 0.00 | 0.00 | 0.00 | 0.00 | 0.00 | 8.5 |
| C. Example 2 | C.P.D. 2 | PR-122 | P-1 | 110.8 | 5.0 | 45.0 | 0.26 | 3.78 | 0.42 | 0.30 | 0.00 | 8.3 |
| C. Example 3 | C.P.D. 3 | PR-122 | P-1 | 110.8 | 5.0 | 35.0 | — | 4.50 | 0.00 | 0.00 | 0.00 | 8.2 |

TABLE 2-continued

| | | Pig. disp. Polm. | | | | Rosin acid | | | | | |
| | | | | | | | Blending amounts | | | | |
| | Pig. | | Acid V. | R. Cont. | A/D. Cont. | Cont. Rat. | [parts by mass] | | | | |
| | Kind | Struct. | mgKOH/g | [mass %] | [mass %] | DiHA/AA | G.R | DiHA | AA | Pim.A | pH |
|---|---|---|---|---|---|---|---|---|---|---|---|
| C. Example 4 | C.P.D. 4 | PR-122 | P-1 | 110.8 | 5.0 | 0.0 | — | 0.00 | 0.00 | 0.00 | 4.50 | 8.4 |
| C. Example 5 | C.P.D. 5 | PR-122 | P-1 | 110.8 | 5.0 | 14.0 | — | 1.80 | 0.00 | 0.00 | 2.70 | 8.5 |

In table 2, the abbreviation "C.Example" represents "Comparative Example", the abbreviation "P.D." represents "Pigment dispersion", the abbreviation "C.P.D." represents "Comparative pigment dispersion", the abbreviation "R.C.P" represents "Rosin containing pigment", the abbreviation "Pig." represents "Pigment", the abbreviation "Pig. disp. Polm." represents "Pigment dispersing polymer", the abbreviation "Struct." represents "Structure", the abbreviation "Acid V" represents "Acid value", the abbreviation "R.Cont." represents "A content of rosin acid with respect to pigment", the abbreviation "A/D. Cont." represents "A total content of AA and DiHA with respect to the rosin acid", the abbreviation "Cont. Rat." represents "Content ratio", the abbreviation "GR" represents "Gum rosin", and the abbreviation "Pim.A" represents "Pimaric acid".

[Measurement of Rosin Acid Amount]

With regard to the pigment dispersions of Examples 1 to 17 (pigment dispersions 1 to 17) and pigment dispersions of Comparative Examples 1 to 5 (comparative pigment dispersions 1 to 5) obtained as described above, the total amount of rosin acid contained in each pigment dispersion and the contents of abietic acid, salts of abietic acid, dihydroabietic acid, and salts of dihydroabietic acid included in the rosin acid were determined by performing quantification using a high performance liquid chromatograph. Results are shown in Table 2.

Note that, in the pigment dispersion of Example 13 (pigment dispersion 13), the total content of abietic acid, salts of abietic acid, dihydroabietic acid, and salts of dihydroabietic acid, with respect to the rosin acid, and the ratio of the total content of abietic acid and salts of abietic acid relative to the total content of dihydroabietic acid and salts of dihydroabietic acid are values which were measured using the pigment dispersion that had been subjected to ultrafiltration.

—Conditions for High Performance Liquid Chromatograph—

Measuring device: high performance chromatograph CHROMASTER (registered trademark) (manufactured by Hitachi High-Tech Science Corporation)

Detector: CORONA (registered trademark) CAD (manufactured by ESA Biosciences, Inc.)

Column: SHIM-PACK SPR-H (trade name, manufactured by Shimadzu Corporation)

Column oven: 40° C.

Flow rate: 1.0 mL/min

Injection quantity: 10 μL

Sample: the pigment dispersion is dried under reduced pressure at ordinary temperature, then 40 mg of the solids thus obtained are dipped in 2 mL of methanol for 10 hours, and then, solids are removed by filtration using a 0.45 μm filter. The resulting solution is used.

[Measurement of Average Particle Diameter of Polymer-Coated Pigment]

With regard to the pigment dispersions of Examples 1 to 17 (pigment dispersions 1 to 17) and pigment dispersions of Comparative Examples 1 to 5 (comparative pigment dispersions 1 to 5) obtained as described above, the average particle diameter (volume average particle diameter) of the polymer-coated pigment in the dispersed state in the pigment dispersion was measured using a Nanotrac particle size distribution analyzer UPA-EX150 (trade name, manufactured by Nikkiso Co., Ltd.), in accordance with a dynamic light scattering method. Results are shown in Table 3.

[Evaluation]

<Dispersibility>

With regard to the pigment dispersions of Examples 1 to 17 (pigment dispersions 1 to 17) and pigment dispersions of Comparative Examples 1 to 5 (comparative pigment dispersions 1 to 5) obtained as described above, the particle size distribution of the polymer-coated pigment was measured using a Nanotrac particle size distribution analyzer (model name: UPA-EX150, manufactured by Nikkiso Co., Ltd.), in accordance with a dynamic light scattering method.

From the obtained particle size distribution, the particle diameters D90, D50, and D10 were calculated, and the polydispersity index (PDI) was determined according to Equation (1) described below.

Here, D90, D50, and D10 represent particle diameters when the integrated value from D=0 of the distribution function is equal to 0.9 (90% by number), 0.5 (50% by number), and 0.1 (10% by number) with respect to the integrated value for the total number of dispersed particles, respectively.

The polydispersity index (PDI) is an index for evaluating the dispersibility of the polymer-coated pigment. When PDI is in the vicinity of 1.10, dispersibility is excellent.

Results are shown in Table 3.

$$\text{Polydispersity index (PDI)} = (D90 - D10)/D50 \qquad \text{Equation (1)}$$

<Storage Stability>

With regard to the pigment dispersions of Examples 1 to 17 (pigment dispersions 1 to 17) and pigment dispersions of Comparative Examples 1 to 5 (comparative pigment dispersions 1 to 5) obtained as described above, evaluation of storage stability was performed.

The pigment dispersion was allowed to stand in a closed state at 50° C. for 336 hours. Thereafter, the average particle diameter of the polymer-coated pigment and the viscosity of the pigment dispersion were measured, and the variation rates in liquid physical properties before and after a lapse of time were calculated.

Further, with regard to the pigment dispersions, in which the variation rates of the average particle diameter of the polymer-coated pigment and the variation rates of the viscosity of the pigment dispersion were each less than 1% under the temperature condition of 50° C., separately, the pigment dispersions were allowed to stand at 60° C. for 336 hours, and thereafter, the average particle diameter of the polymer-coated pigment and the viscosity of the pigment dispersion were measured, and the variation rates in liquid physical properties before and after a lapse of time were calculated.

The average particle diameter (volume average particle diameter) of the polymer-coated pigment was measured using a Nanotrac particle size distribution analyzer UPA-EX150 (trade name, manufactured by Nikkiso Co., Ltd.), in accordance with a dynamic light scattering method.

Further, the viscosity was measured using a B type viscometer (manufactured by Brookfield Engineering Laboratories, Inc.). Here, the liquid temperature of the pigment dispersion at the time of measurement was adjusted to 30° C.

The variation rate in the average particle diameter of the polymer-coated pigment was determined according to the following equation: [(Average particle diameter after a lapse of time−Initial average particle diameter)/Initial average particle diameter]×100. The variation rate in the average particle diameter of the polymer-coated pigment is an index of aggregation of the polymer-coated pigment.

Further, the variation rate in the viscosity of the pigment dispersion was determined according to the following equation: [(Viscosity after a lapse of time−Initial viscosity)/Initial viscosity]×100.

Based on the respective values of variation rate thus obtained, storage stability of the pigment dispersion was evaluated according to the following evaluation criteria.

Note that, those acceptable in terms of practical application can be classified into grades [AAA], [AA], [A], and [B].

Results are shown in Table 3.

—Evaluation Criteria—

AAA: both the variation rate in the average particle diameter of the polymer-coated pigment and the variation rate in the viscosity of the pigment dispersion are less than 1% under an evaluation temperature of 50° C., and also both the variation rate in the average particle diameter of the polymer-coated pigment and the variation rate in the viscosity of the pigment dispersion are less than 1% under an evaluation temperature of 60° C.

AA: both the variation rate in the average particle diameter of the polymer-coated pigment and the variation rate in the viscosity of the pigment dispersion are less than 1%, and also one of the variation rate in the average particle diameter of the polymer-coated pigment and the variation rate in the viscosity of the pigment dispersion is 1% or more under an evaluation temperature of 60° C.

A: the variation rate in the average particle diameter of the polymer-coated pigment is 1% or more but less than 2% and the variation rate in the viscosity of the pigment dispersion is 1% or more but less than 6%; or, the variation rate in the average particle diameter of the polymer-coated pigment is 1% or more but less than 2% or the variation rate in the viscosity of the pigment dispersion is 1% or more but less than 6%.

B: the variation rate in the average particle diameter of the polymer-coated pigment is 2% or more but less than 5% and the variation rate in the viscosity of the pigment dispersion is 6% or more but less than 15%; or, the variation rate in the average particle diameter of the polymer-coated pigment is 2% or more but less than 5% or the variation rate in the viscosity of the pigment dispersion is 6% or more but less than 15%.

C: the variation rate in the average particle diameter of the polymer-coated pigment is 5% or more but less than 10% and the variation rate in the viscosity of the pigment dispersion is 15% or more but less than 25%; or, the variation rate in the average particle diameter of the polymer-coated pigment is 5% or more but less than 10% or the variation rate in the viscosity of the pigment dispersion is 15% or more but less than 25%.

D: the variation rate in the average particle diameter of the polymer-coated pigment is 10% or more and the variation rate in the viscosity of the pigment dispersion is 25% or more; or, the variation rate in the average particle diameter of the polymer-coated pigment is 10% or more or the variation rate in the viscosity of the pigment dispersion is 25% or more.

TABLE 3

|  |  | Average particle diameter of Polymer-coated pigment (nm) | Polydispersity index (D90 − D10)/D50 | Storage stability |
|---|---|---|---|---|
| Example 1A | Pigment dispersion 1 | 96 | 1.08 | AA |
| Example 2A | Pigment dispersion 2 | 94 | 1.16 | A |
| Example 3A | Pigment dispersion 3 | 105 | 1.30 | A |
| Example 4A | Pigment dispersion 4 | 102 | 1.22 | A |
| Example 5A | Pigment dispersion 5 | 113 | 1.26 | B |
| Example 6A | Pigment dispersion 6 | 97 | 1.25 | B |
| Example 7A | Pigment dispersion 7 | 120 | 1.30 | B |
| Example 8A | Pigment dispersion 8 | 125 | 1.44 | B |
| Example 9A | Pigment dispersion 9 | 110 | 1.20 | A |
| Example 10A | Pigment dispersion 10 | 135 | 1.71 | B |
| Example 11A | Pigment dispersion 11 | 120 | 1.55 | B |
| Example 12A | Pigment dispersion 12 | 122 | 1.39 | A |
| Example 13A | Pigment dispersion 13 | 100 | 1.08 | AAA |
| Example 14A | Pigment dispersion 14 | 110 | 1.19 | AA |
| Example 15A | Pigment dispersion 15 | 155 | 1.69 | B |
| Example 16A | Pigment dispersion 16 | 99 | 1.14 | AAA |
| Example 17A | Pigment dispersion 17 | 109 | 1.40 | B |
| Comparative Example 1A | Comparative pigment dispersion 1 | 175 | 2.12 | D |
| Comparative Example 2A | Comparative pigment dispersion 2 | 112 | 1.62 | D |
| Comparative Example 3A | Comparative pigment dispersion 3 | 128 | 1.44 | C |

TABLE 3-continued

|  |  | Average particle diameter of Polymer-coated pigment (nm) | Polydispersity index (D90 − D10)/D50 | Storage stability |
|---|---|---|---|---|
| Comparative Example 4A | Comparative pigment dispersion 4 | 138 | 1.65 | D |
| Comparative Example 5A | Comparative pigment dispersion 5 | 126 | 1.55 | C |

As shown in Table 3, the pigment dispersions of Examples 1 to 17 (pigment dispersions 1 to 17), each of which contains water, a pigment, a pigment dispersing polymer, and a rosin acid including at least one selected from the group consisting of abietic acid, salts of abietic acid, dihydroabietic acid, and salts of dihydroabietic acid, and in which the total content of abietic acid, salts of abietic acid, dihydroabietic acid, and salts of dihydroabietic acid, based on the whole rosin acid contained in the pigment dispersion, is 50% by mass or higher, all exhibited excellent dispersibility and excellent storage stability.

In contrast, the pigment dispersions of Comparative Examples 1 to 5 (comparative pigment dispersions 1 to 5) all exhibited inferior storage stability.

The pigment dispersion of Example 13 (pigment dispersion 13), which was obtained by a method including a decrease process of decreasing the amount of rosin acid after the dispersion process, and the pigment dispersion of Example 16 (pigment dispersion 16), which was obtained by a method including crosslinking between the polymer molecules of the pigment dispersing polymer that covers the pigment, exhibited remarkably excellent storage stability, as compared with the pigment dispersions of other Examples.

The pigment dispersions of Examples 1, 4, and 9 (pigment dispersions 1, 4, and 9), in which the pH is within the range of from 8.0 to 9.5, exhibited more excellent storage stability, as compared with the pigment dispersions of Examples 5 and 6 (pigment dispersions 5 and 6), in which the pH is outside the range.

The pigment dispersion of Example 9 (pigment dispersion 9), in which the acid value of the pigment dispersing polymer is within the range of from 90 mgKOH/g to 150 mgKOH/g, exhibited more excellent dispersibility and more excellent storage stability, as compared with the pigment dispersions of Examples 7 and 8 (pigment dispersions 7 and 8), in which the acid value of the pigment dispersing polymer is outside the range.

[Preparation of Ink]

Using the pigment dispersions of Examples 1 to 17 (pigment dispersions 1 to 17) and pigment dispersions of Comparative Examples 1 to 5 (comparative pigment dispersions 1 to 5) obtained as described above, inks of Examples 1A to 17A and inks of Comparative Examples 1A to 5A were prepared.

The components of the following composition were mixed, thereby obtaining an ink.

Note that, the ink thus obtained is also a mode of a pigment dispersion.

—Ink Composition—

| Pigment dispersion (pigment solids concentration: 15% by mass) | 6.5 parts by mass |
|---|---|
| Tripropylene glycol monomethyl ether (TPGmME) (water soluble organic solvent, manufactured by Wako Pure Chemical Industries, Ltd.) | 2.0 parts by mass |
| Dipropylene glycol (DPG) (water soluble organic solvent, manufactured by Wako Pure Chemical Industries, Ltd.) | 2.0 parts by mass |
| SANNIX GP250 (trade name, manufactured by Sanyo Chemical Industries, Ltd.; polyoxypropylene glyceryl ether, water soluble organic solvent) | 10.0 parts by mass |
| Urea | 5.0 parts by mass |
| OLFINE (registered trademark) E1010 (surfactant, manufactured by Nissin Chemical Industry Co., Ltd.) | 1.5 parts by mass |
| Ion exchanged water | Remainder up to the total amount of 100 parts by mass |

[Evaluation]
<Ejection Property>

With regard to the inks of Examples 1A to 17A and inks of Comparative Examples 1A to 5A obtained as described above, evaluation of ejection property was performed.

A GELJET GX5000 PRINTER HEAD (trade name, manufactured by Ricoh Co., Ltd.) was fixed and arranged in the direction perpendicular to the moving direction (sub scanning direction) of the stage movable in a predetermined linear direction at a velocity of 500 mm/sec, in accordance with the direction of the line head (main scanning direction) where nozzles were arranged in a line.

Then, the storage tank connected to the above printer head was refilled with ink. As the recording medium, a sheet of "KASSAI SHASHIN SHIAGE PRO" (trade name, manufactured by Fujifilm Corporation), which is a paper exclusively used for inkjet recording, was fixed on the stage.

Next, while moving the stage at a velocity of 248 mm/min, ink droplets were ejected under the conditions of an ink droplet amount of 3.4 pL, an ejection frequency of 10 kHz, and a resolution of 75 dpi (dots per inch) in the sub scanning direction×1200 dpi in the main scanning direction, such that 2000 ink droplets per one nozzle (per one discharge hole) were ejected to print 96 lines in a direction parallel to the conveying direction, thereby preparing a printed sample.

The obtained printed sample was visually observed, and it was verified that the ink ejected from all of the nozzles (discharge holes).

After ejecting the ink, the head was allowed to stand as it was for 3 hours under an environment of 25° C. and 80% RH. After standing, another sheet of the recording medium was fixed on the stage, and the ink was ejected again under the same conditions to prepare a printed sample.

The obtained printed sample was visually observed, and the number of non-ejection nozzles after ejecting 2000 ink droplets was measured. Evaluation of ejection property was performed according to the following evaluation criteria.

Note that, those acceptable in terms of practical application can be classified into grades [AA], [A], and [B].
Results are shown in Table 4.
—Evaluation Criteria—
AA: the number of non-ejection nozzles is 0.
A: the number of non-ejection nozzles is from 1 to 5.
B: the number of non-ejection nozzles is from 6 to 10.
C: the number of non-ejection nozzles is from 11 to 15.
D: the number of non-ejection nozzles is 16 or more.

TABLE 4

| | | Ejection property |
|---|---|---|
| Example 1A | Pigment dispersion 1 | AA |
| Example 2A | Pigment dispersion 2 | AA |
| Example 3A | Pigment dispersion 3 | A |
| Example 4A | Pigment dispersion 4 | A |
| Example 5A | Pigment dispersion 5 | A |
| Example 6A | Pigment dispersion 6 | A |
| Example 7A | Pigment dispersion 7 | B |
| Example 8A | Pigment dispersion 8 | B |
| Example 9A | Pigment dispersion 9 | A |
| Example 10A | Pigment dispersion 10 | B |
| Example 11A | Pigment dispersion 11 | B |
| Example 12A | Pigment dispersion 12 | A |
| Example 13A | Pigment dispersion 13 | AA |
| Example 14A | Pigment dispersion 14 | A |
| Example 15A | Pigment dispersion 15 | B |
| Example 16A | Pigment dispersion 16 | AA |
| Example 17A | Pigment dispersion 17 | B |
| Comparative Example 1A | Comparative pigment dispersion 1 | C |
| Comparative Example 2A | Comparative pigment dispersion 2 | D |
| Comparative Example 3A | Comparative pigment dispersion 3 | C |
| Comparative Example 4A | Comparative pigment dispersion 4 | D |
| Comparative Example 5A | Comparative pigment dispersion 5 | C |

As shown in Table 4, the inks of Examples 1A to 17A, each of which contains water, a pigment, a pigment dispersing polymer, and a rosin acid including at least one selected from the group consisting of abietic acid, salts of abietic acid, dihydroabietic acid, and salts of dihydroabietic acid, and in which the total content of abietic acid, salts of abietic acid, dihydroabietic acid, and salts of dihydroabietic acid, based on the whole rosin acid contained in the ink, is 50% by mass or higher, all exhibited excellent ejection property.

In contrast, the inks of Comparative Examples 1A to 5A all exhibited inferior ejection property.

The ink of Example 13A, which was obtained by a method including a decrease process of decreasing the amount of rosin acid after the dispersion process, exhibited remarkably excellent ejection property. On the other hand, with regard to the ink of Example 10A containing a relatively larger amount of rosin acid with respect to the pigment, a tendency to exhibit inferior ejection property was recognized, as compared with the inks containing a smaller amount of rosin acid.

The ink of Example 16A, which was obtained by a method including crosslinking between the polymer molecules of the pigment dispersing polymer that covers the pigment, exhibited remarkably excellent ejection property.

The inks of Examples 1A and 2A, in which the ratio of the total content of dihydroabietic acid and salts of dihydroabietic acid relative to the total content of abietic acid and salts of abietic acid is within the range of from 0.1 to 1.0 on the basis of mass, exhibited more excellent ejection property, as compared with the ink of Example 11A, in which the ratio is outside the range.

The ink of Example 9A, in which the acid value of the pigment dispersing polymer is within the range of from 90 mgKOH/g to 150 mgKOH/g, exhibited more excellent ejection property, as compared with the inks of Examples 7A and 8A, in which the acid value of the pigment dispersing polymer is outside the range.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A pigment dispersion comprising:
    water;
    a pigment;
    a pigment dispersing polymer; and
    a rosin acid that includes at least one selected from the group consisting of abietic acid, salts of abietic acid, dihydroabietic acid and salts of dihydroabietic acid;
    wherein a total content of abietic acid, salts of abietic acid, dihydroabietic acid and salts of dihydroabietic acid is 50% by mass or higher with respect to a total mass of the rosin acid contained in the pigment dispersion, and
    wherein a ratio of a total content of dihydroabietic acid and salts of dihydroabietic acid relative to a total content of abietic acid and salts of abietic acid (total content of dihydroabietic acid and salts of dihydroabietic acid/total content of abietic acid and salts of abietic acid) is in a range of from 0.1 to 1.0 based on mass, and
    wherein the pigment dispersing polymer is selected from the group consisting of a (meth)acrylic acid/benzyl (meth)acrylate copolymer, a (meth)acrylic acid/phenoxyethyl (meth)acrylate copolymer, and a copolymer of (meth)acrylic acid/phenoxyethyl (meth)acrylate/(meth)acrylate having an alkyl group having from 1 to 20 carbon atoms, and
    wherein a content of the rosin acid is in a range of from 0.25% by mass to 30.0% by mass with respect to a total mass of the pigment.

2. The pigment dispersion according to claim 1, wherein a content of the rosin acid is in a range of from 0.25% by mass to less than 3.0% by mass with respect to a total mass of the pigment.

3. The pigment dispersion according to claim 1, wherein the total content of abietic acid, salts of abietic acid, dihydroabietic acid and salts of dihydroabietic acid is in a range of from 60% by mass to 95% by mass with respect to the total mass of the rosin acid.

4. The pigment dispersion according to claim 1, wherein the pigment dispersing polymer comprises a hydrophilic structural unit and a hydrophobic structural unit.

5. The pigment dispersion according to claim 1, wherein the total content of abietic acid, salts of abietic acid, dihydroabietic acid and salts of dihydroabietic acid is in a range of from 60% by mass to 95% by mass with respect to the total mass of the rosin acid.

6. The pigment dispersion according to claim 1, wherein an acid value of the pigment dispersing polymer is in a range of from 90 mgKOH/g to 150 mgKOH/g.

7. The pigment dispersion according to claim 1, wherein a pH of the pigment dispersion is in a range of from 8.0 to 9.5.

8. The pigment dispersion according to claim 5, wherein an acid value of the pigment dispersing polymer is in a range of from 90 mgKOH/g to 150 mgKOH/g, and a pH of the pigment dispersion is in a range of from 8.0 to 9.5.

9. The pigment dispersion according to claim 1, wherein the pigment dispersing polymer comprises a cross-linked structure.

10. The pigment dispersion according to claim 8, wherein the pigment dispersing polymer comprises a cross-linked structure.

11. The pigment dispersion according to claim 1, wherein the pigment dispersion is used for an inkjet recording ink.

12. The pigment dispersion according to claim 1, wherein the salts of abietic acid is calcium salts of abietic acid, and the salts of dihydroabietic acid is calcium salts of dihydroabietic acid.

13. A method of producing a pigment dispersion, the method comprising:
    a mixing process of mixing water, a pigment, a pigment dispersing polymer selected from the group consisting of a (meth)acrylic acid/benzyl (meth)acrylate copolymer, a (meth)acrylic acid/phenoxyethyl (meth)acrylate copolymer, and a copolymer of (meth)acrylic acid/phenoxyethyl (meth)acrylate/(meth)acrylate having an alkyl group having from 1 to 20 carbon atoms, and a rosin acid including at least one selected from the group consisting of abietic acid, salts of abietic acid, dihydroabietic acid, and salts of dihydroabietic acid, to obtain a mixture liquid, in which a total content of abietic acid, salts of abietic acid, dihydroabietic acid, and salts of dihydroabietic acid is 50% by mass or higher, with respect to a total content of the rosin acid, in which a ratio of a total content of dihydroabietic acid and salts of dihydroabietic acid relative to a total content of abietic acid and salts of abietic acid (total content of dihydroabietic acid and salts of dihydroabietic acid/total content of abietic acid and salts of abietic acid) is in a range of from 0.1 to 1.0 based on mass, and in which a content of the rosin acid is in a range of from 0.25% by mass to 30.0% by mass with respect to a total mass of the pigment; and
    a dispersion process of subjecting the mixture liquid obtained in the mixing process to a dispersion treatment, to obtain a dispersion.

14. The method of producing a pigment dispersion according to claim 13, wherein an amount of the rosin acid contained in the mixture liquid obtained in the mixing process is 3.0% by mass or more and 30.0% by mass or less, with respect to a mass of the pigment.

15. The method of producing a pigment dispersion according to claim 13, wherein the mixing process comprises:
    a first process of mixing at least the pigment and the rosin acid including at least one selected from the group consisting of abietic acid, salts of abietic acid, dihydroabietic acid, and salts of dihydroabietic acid, to obtain a first liquid; and
    a second process of mixing the pigment dispersing polymer and the first liquid obtained in the first process, to obtain a second liquid.

16. The method of producing a pigment dispersion according to claim 13, further comprising a pH adjusting process that adjusts a pH of the mixture liquid obtained in the mixing process to 8.0 or more and 9.5 or less by using a water solution containing a monovalent alkali metal.

17. The method of producing a pigment dispersion according to claim 13, further comprising a reducing process that reduces an amount of the rosin acid in the dispersion obtained in the dispersion process to less than 3.0% by mass with respect to a total mass of the pigment.

18. The method of producing a pigment dispersion according to claim 15, further comprising:
    a pH adjusting process that adjusts a pH of the mixture liquid obtained in the mixing process to 8.0 or more and 9.5 or less by using a water solution containing a monovalent alkali metal; and
    a reducing process that reduces an amount of the rosin acid in the dispersion obtained in the dispersion process to less than 3.0% by mass with respect to a total mass of the pigment.

* * * * *